United States Patent
Ja

(10) Patent No.: US 12,395,756 B2
(45) Date of Patent: Aug. 19, 2025

(54) METHOD AND SYSTEMS FOR ON-DEMAND IMAGE INTENSITY CORRECTION

(71) Applicant: ARACELI BIOSCIENCES INC., Tigard, OR (US)

(72) Inventor: Shiou-jyh Ja, Portland, OR (US)

(73) Assignee: ARACELI BIOSCIENCES, Tigard, OR (US)

(*) Notice: Subject to any disclaimer, the term of this patent is extended or adjusted under 35 U.S.C. 154(b) by 294 days.

(21) Appl. No.: 18/193,548

(22) Filed: Mar. 30, 2023

(65) Prior Publication Data

US 2024/0334083 A1   Oct. 3, 2024

(51) Int. Cl.
  *H04N 25/673* (2023.01)
  *G02B 21/36* (2006.01)
  *H04N 23/76* (2023.01)

(52) U.S. Cl.
  CPC ......... *H04N 25/673* (2023.01); *G02B 21/367* (2013.01); *H04N 23/76* (2023.01)

(58) Field of Classification Search
  None
  See application file for complete search history.

(56) References Cited

U.S. PATENT DOCUMENTS

| | | | | |
|---|---|---|---|---|
| 6,061,102 A * | 5/2000 | Sheppard | ................ | H04N 5/20 348/E5.073 |
| 8,982,263 B2 * | 3/2015 | Cazier | .................. | H04N 25/61 348/135 |
| 10,788,423 B2 * | 9/2020 | Barich | ................ | H04N 5/2624 |
| 2003/0053671 A1 * | 3/2003 | Dewaele | .................. | G06T 5/90 382/132 |
| 2006/0109475 A1 * | 5/2006 | Misener | ............ | G01N 21/8483 356/446 |
| 2007/0001117 A1 * | 1/2007 | Sagatelyan | ............... | G01J 3/28 250/341.5 |
| 2007/0046820 A1 * | 3/2007 | Mead | .................... | H04N 5/145 348/554 |

(Continued)

OTHER PUBLICATIONS

"Flat-field correction," Wikipedia Website, Available Online at https://en.wikipedia.org/wiki/Flat-field_correction, Page Created Jun. 3, 2005, 4 pages.

(Continued)

*Primary Examiner* — Mohammad J Rahman
(74) *Attorney, Agent, or Firm* — McCoy Russell LLP

(57) ABSTRACT

Methods and systems are provided for correcting intensity variation in a raw image acquired via a microscopy imaging system. In one example, a method includes acquiring a reference image and developing an intensity model based on the reference image wherein the intensity model comprises a pre-determined number of a plurality of model parameters obtained via curve fitting a single analytical function or a linear combination of a plurality of analytical functions, embedding model parameters of the intensity model of the reference image into the raw image for image processing at a later time; and correcting the raw image based on the intensity model of the reference image on-demand. As another example, a method includes utilizing the plurality of parameters of the intensity model as a hardware signature to indicate whether a plurality of optical system parameters is maintained.

20 Claims, 10 Drawing Sheets

(56) References Cited

U.S. PATENT DOCUMENTS

| | | | |
|---|---|---|---|
| 2012/0015825 A1* | 1/2012 | Zhong | G01N 21/6428 |
| | | | 506/13 |
| 2013/0208164 A1* | 8/2013 | Cazier | H04N 25/61 |
| | | | 348/333.04 |
| 2014/0297068 A1* | 10/2014 | Revell | G08G 5/21 |
| | | | 701/16 |
| 2018/0376085 A1* | 12/2018 | Tabel | H04N 25/72 |
| 2023/0055333 A1 | 2/2023 | Policelli et al. | |
| 2023/0056456 A1 | 2/2023 | Policelli et al. | |
| 2023/0057023 A1 | 2/2023 | Policelli et al. | |
| 2023/0057099 A1 | 2/2023 | Anderson | |
| 2023/0058085 A1 | 2/2023 | Policelli et al. | |
| 2023/0105441 A1* | 4/2023 | Lalena | A61B 6/4233 |
| | | | 378/207 |

OTHER PUBLICATIONS

Ja, S., "System and Method for Microscope High-Speed Auto-Focusing," U.S. Appl. No. 17/808,491, filed Jun. 23, 2022, 73 pages.

* cited by examiner

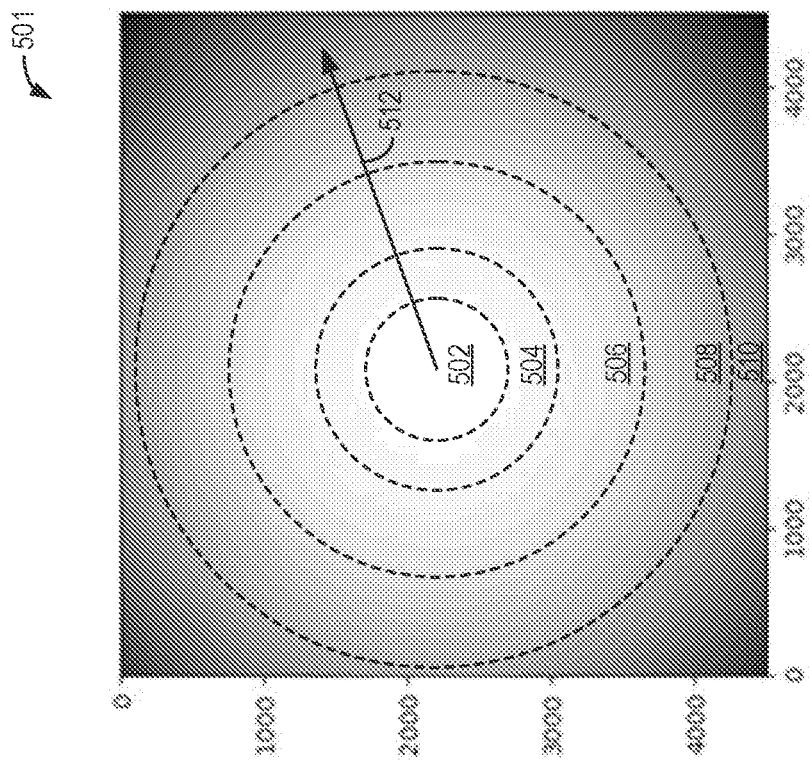

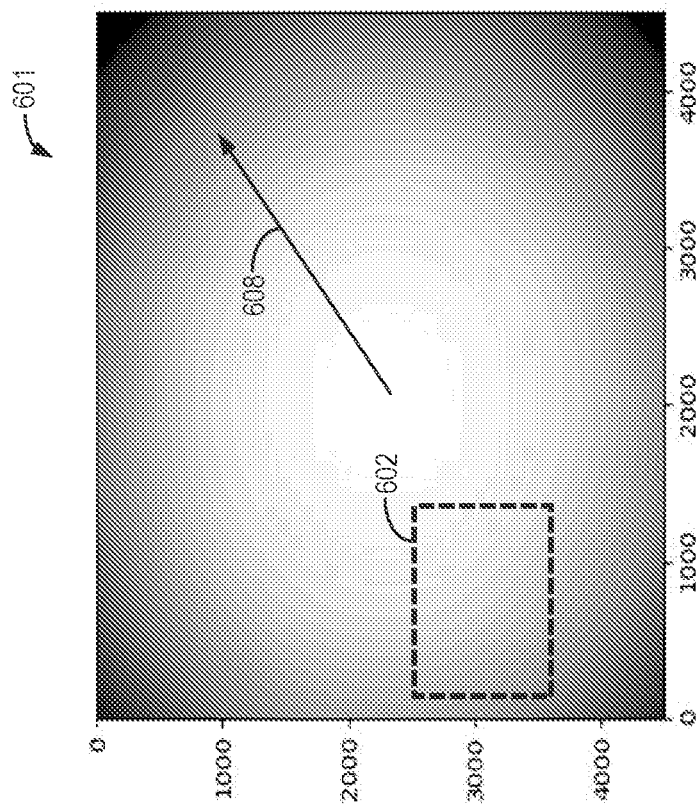
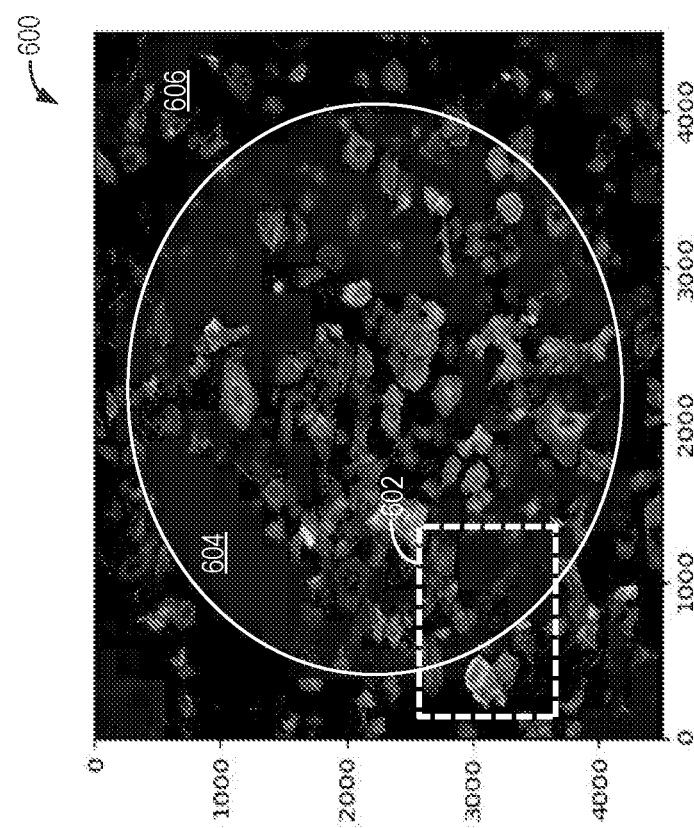
FIG. 6B
FIG. 6A

METHOD AND SYSTEMS FOR ON-DEMAND IMAGE INTENSITY CORRECTION

FIELD

The present description relates generally to methods and systems to flat-field correction in fluorescence microscopy.

BACKGROUND/SUMMARY

An image obtained with fluorescence microscopy may exhibit a certain degree of non-uniformity in intensity of the image. The non-uniformity in intensity may be due to vignetting of the optical system, excitation intensity roll-off of an illumination source, and/or misalignment in an optical train. In intensity sensitive applications, the image may be subjected to post-processing to reduce intensity roll-off and increase image quality. A flat-field correction procedure may be implemented to reduce intensity variation due to intensity roll-off of a raw image. The flat-field correction procedure utilizes a reference image to reduce intensity-roll off of the raw image.

However, the flat-field correction procedure may be computationally intensive which may not be desirable for speed sensitive applications. Further, storing the reference image for offline correction may increase the frequency of errors as a result of the large quantity of image data being stored. The present disclosure recognizes and attempts to address the disadvantages of the existing flat-field correction procedure described above. For example, a flat-field correction procedure may include embedding information regarding the reference image into a metadata field of the raw image and performing the flat-field correction at a later time and only on the portion of the raw images with significant intensity roll-off. In this way, the flat-field correction procedure may be less computationally intensive for applications with large quantities of image data, reducing the time for image acquisition and image storage. Further, the information regarding the reference image may be utilized as a hardware signature of the microscopy imaging system. Deviations from the hardware signature may indicate changes to the optical system that prevent the hardware signature from being utilized for quality control. As such, the reference image may not be utilized when performing flat-field correction.

In one example, the issues described above may be addressed by a method for on-demand intensity correction of a microscopy imaging system, comprising acquiring a reference image and developing an intensity model based on the reference image wherein the intensity model comprises a pre-determined number of a plurality of model parameters obtained via curve fitting a single analytical function or a linear combination of a plurality of analytical functions, embedding model parameters of the intensity model of the reference image into the raw image for image processing at a later time, and correcting the raw image based on the intensity model of the reference image on-demand.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 5A, 5B, 5C, and 5D show an example of image intensity modeling;

FIGS. 6A, 6B, 6C, and 6D show an example of an image intensity correction;

DETAILED DESCRIPTION

Figure 1:
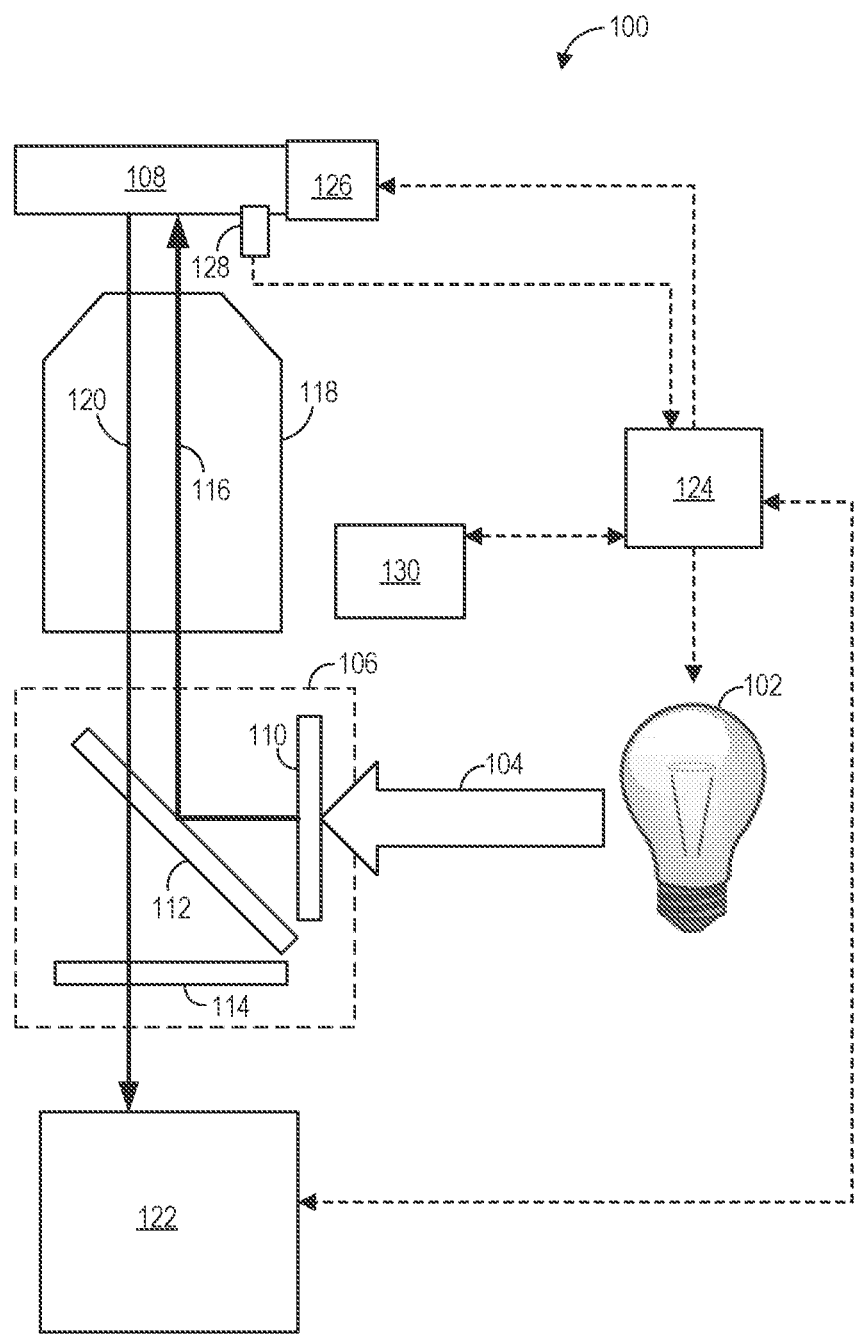
FIG. 1 shows a schematic diagram of a quantitative microscopy assembly.
Figure 2:
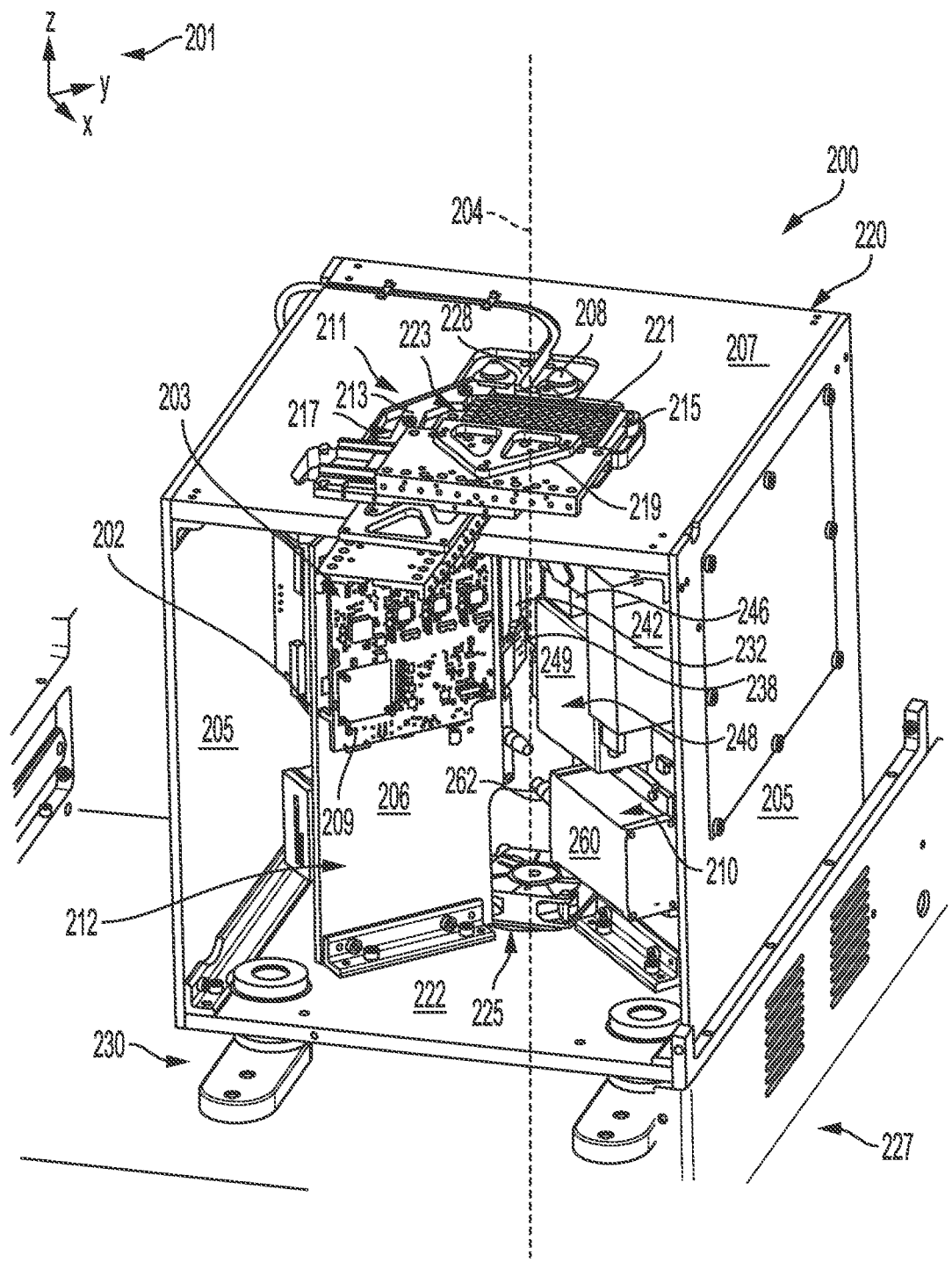
FIG. 2 shows a perspective view of a multi-detector quantitative microscopy system.

The following description relates to systems and methods for high throughput quantitative microscopy. Quantitative microscopy may be used to extract information from digital images by illuminating a sample with a desired wavelength, or range of wavelengths, of light. In one example, the wavelength may be selected to induce fluorescence from the sample which may be measured by a detector to provide a quantitative analysis of sample properties. An exemplary microscope imaging system is described with respect to FIG. 1 and FIG. 2. The microscope imaging system may be a multi-detector quantitative microscope system. An example of an assembly for quantitative microscopy is depicted in FIG. 1 as a schematic diagram. The assembly shown in FIG. 1 may be included in each of four blades of a multi-detector quantitative microscopy system, as shown in FIG. 2.

Figure 3:
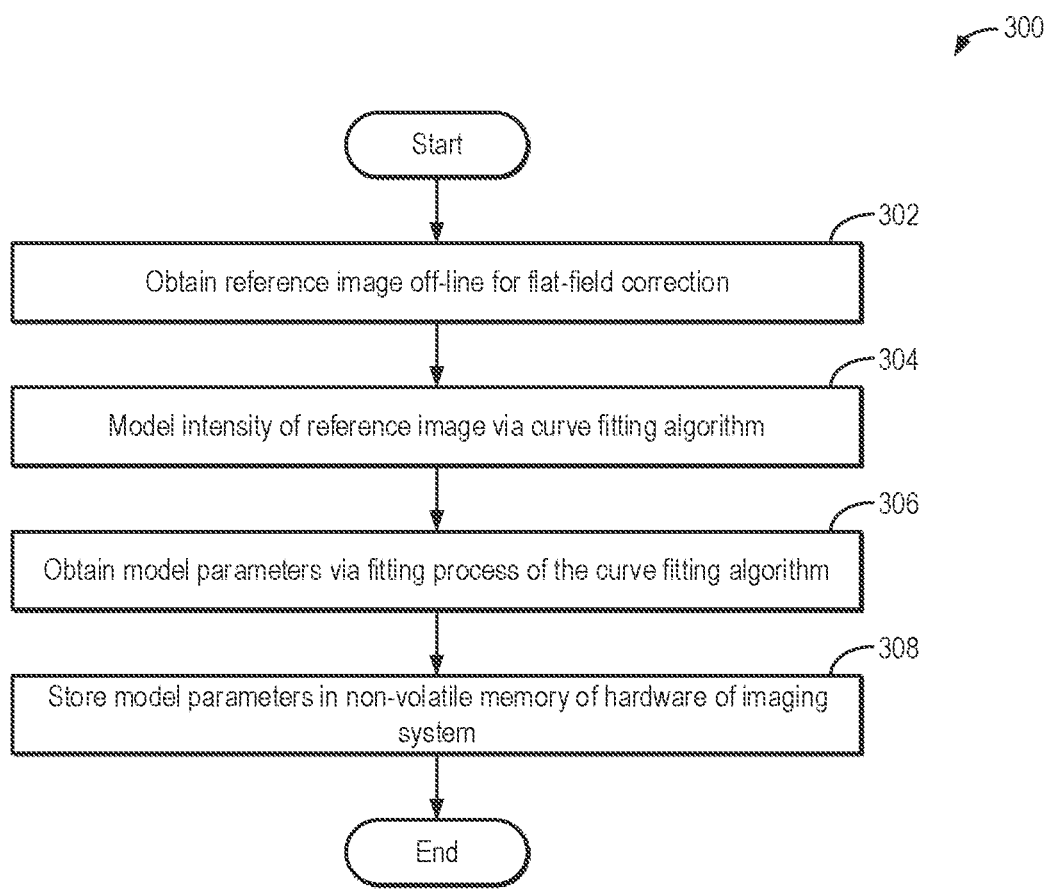
FIG. 3 shows a flow diagram of a method for developing an intensity model based on a reference image.
Figure 4:
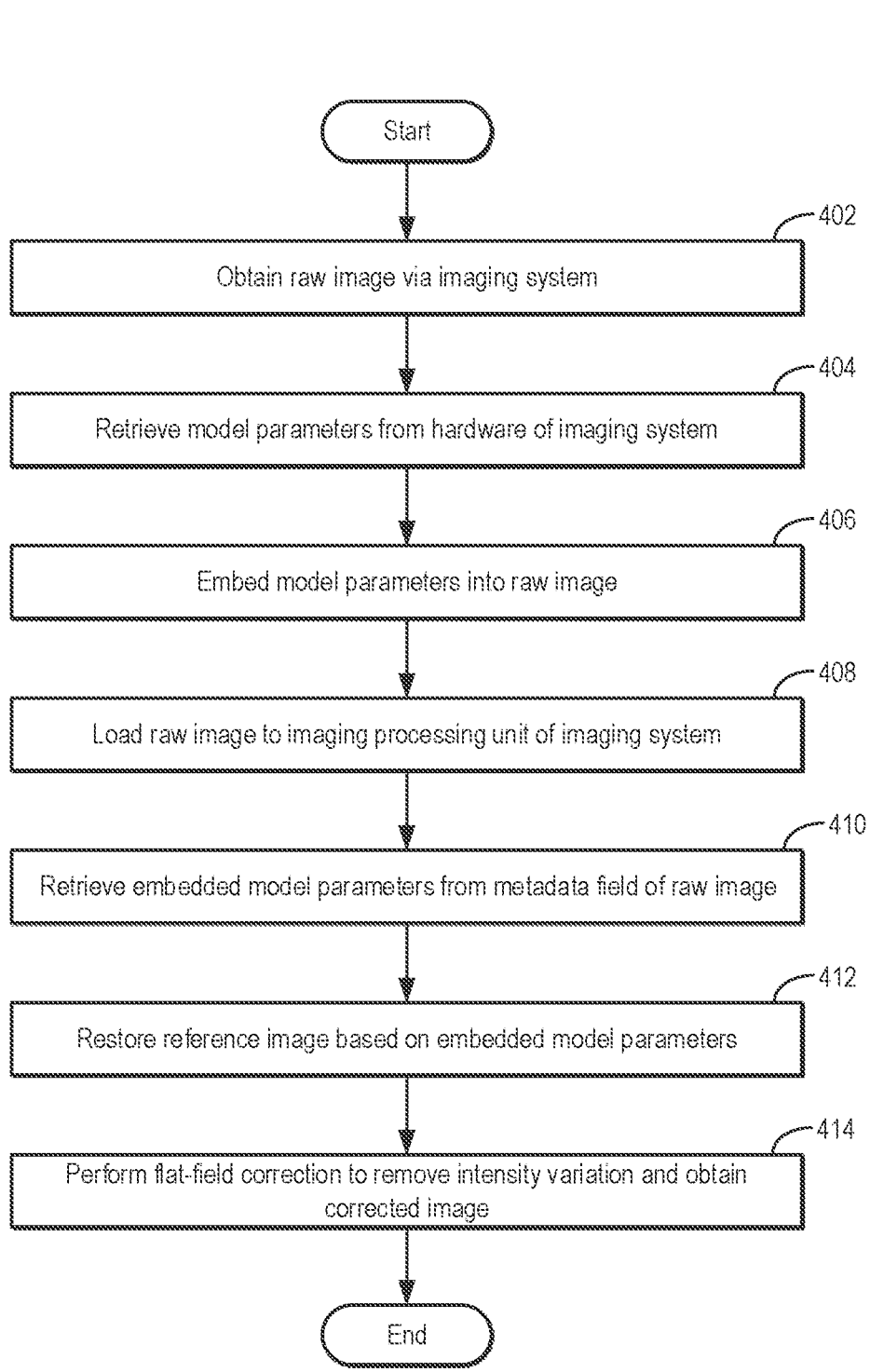
FIG. 4 shows a flow diagram of a method for on-demand image intensity correction.

A plurality of model parameters of an intensity model of a reference image acquired via the quantitative microscopy assembly may be acquired according to the method described in FIG. 3. A method for performing flat-field correction on a raw image acquired via the quantitative microscopy assembly to reduce intensity variation of a raw image is illustrated in FIG. 4. FIGS. 5A-5D depict an example of modeling image intensity according to the methods described herein. Similarly, FIGS. 6A-6D show an example of performing flat-field correction on a raw image acquired via the quantitative microscopy assembly according to the methods described herein. The plurality of model parameters may be utilized as a hardware signature for an imaging system according to the method described in FIG. 7. A timing diagram wherein a hardware signature is utilized as a quality control measure of the quantitative microscopy assembly is shown in FIG. 8.

Turning now to FIG. 1, a schematic diagram for a quantitative microscopy assembly 100 (hereafter, the assembly 100) is shown. In one example, the assembly 100 may be configured as a fluorescence microscopy assembly. However, various other types of analytical microscopic imaging techniques are possible, including but not limited to luminescence, colorimetry, etc. The assembly 100 of FIG. 1 includes a light source 102 providing incident light to components arranged in a path of the incident light, as indicated by arrow 104. The light source 102 may be a mercury-vapor lamp, a xenon arc lamp, a laser, or one or more light-emitting diodes (LEDs).

The incident light may be directed to a filter cube (or filter block) 106. The filter cube 106 may house components that filter the incident light such that target wavelengths are transmitted to a target to be analyzed, e.g., one or more samples supported on a sample holder 108. In one example, the sample holder 108 may be a microplate. Three filtering components are arranged in the filter cube 106, including an excitation filter 110, a dichroic filter 112, and an emission filter 114. The incident light may first pass through the excitation filter 110 which filters the light to allow only select, e.g., target, wavelengths to continue past the excitation filter 110. The target wavelengths may be wavelengths that excite electrons in specific fluorophores or fluorochromes, resulting in release of photons when the excited electrons relax to a ground state. The excitation light, e.g., light that has been filtered by the excitation filter 110, then strikes the dichroic filter (or dichroic beamsplitter) 112, as indicated by arrow 116. The dichroic filter 112 may be a mirror, for example, arranged at a 45 degree angle relative to an optical path of the assembly 100, e.g., angled at 45 degrees relative to the path of incident light indicated by arrow 104.

A surface of the dichroic filter 112 may include a coating that reflects the excitation light, e.g., light filtered by the excitation filter 110 but allows fluorescence emitted from the sample at the sample holder 108 to pass therethrough. The reflected excitation light, as indicated by arrow 116, passes through an objective 118 to illuminate the sample holder 108. If the sample fluoresces, light is emitted, e.g., generating emission light as indicated by arrow 120, and collected by the objective 118. The emission light passes through the dichroic filter 112 and continues to the emission filter 114 which blocks undesired excitation wavelengths. The filtered emission light is received at a detector 122. The detector 122 may be a camera, such as a charge-coupled device (CCD) camera, in one example. In other examples, the detector 122 may be another type of camera, for example, a CMOS camera, or a photomultiplier tube.

At the detector 122, the emission light may be converted into electronic data. For example, when the detector 122 is the CMOS camera, the detector 122 may include a light sensor configured as a transistor on an integrated circuit. Photons of the emission light may be incident on the light sensor and generate an electrical charge that is converted into electronic data representative of a photon pattern of the emission light captured within a field of view (FOV) of the camera. The electronic data may be stored at a memory of the camera, such as random access memory, and may be retrieved by a controller 124.

The controller 124 may be a computer, including various components such as a processor, input/output ports, an electronic storage medium for executable programs and calibration values, random access memory, a data bus, etc. The electronic storage medium can be programmed with computer readable data representing instructions executable by the processor for performing the methods described below as well as other variants that are anticipated but not specifically listed. The controller 124 may be coupled to various accessory devices including input devices such as a keyboard, a mouse, etc.

The controller 124 may be communicatively coupled to components of the assembly 100. For example, the controller 124 may be configured to command activation/deactivation of the light source 102 when prompted based on user input. As another example, the controller 124 may instruct adjustment of a position of the sample holder 108 to focus the excitation light on a different region of the sample holder. The controller 124 may command actuation of a motor 126 coupled to the sample holder 108 to vary the position of the sample holder 108 with respect to the objective 118 and the excitation light and provide instructions on how the sample holder position is to be modified.

In some examples, a position sensor 128 may monitor the actual position of the sample holder 108 and may be communicatively coupled to the controller 124 to relay the sample holder position to the controller 124.

The controller 124 may also be communicatively coupled to the detector 122. As such, electronic data collected by the detector 122 may be retrieved by the controller 124 for further processing and display at an interface, such as a computer monitor, according to the methods described herein with respect to FIGS. 3, 4 and 7. It will be appreciated that the controller 124 may be further coupled to other sensors and actuators of the assembly 100. In one example, communication between the controller 124 and the sensors and actuators of the assembly 100 may be enabled by various electronic cables, e.g., hardwiring. In other examples, the controller 124 may communicate with the sensors and actuators via a wireless protocol, such as Wifi, Bluetooth, Long Term Evolution (LTE), etc.

The assembly 100 may further include an auto-focus system 130, communicatively coupled to the controller 124. The auto-focus system 130 may utilize a sensor configured with a light source and optical elements for modifying and directing a light beam from the light source to the sample holder 108. An image may be generated based on reflection of the light beam which may be used by the controller 124 to determine a suitable adjustment of the objective and/or the sample holder 108 to align the focus of the objective with a target interface at the sample holder 108. In one example, the auto-focus system 130 may rely on a laser beam and auto-focus algorithms implemented at the controller 124 to rapidly focus the assembly 100 on a desired area of the sample.

It will be appreciated that the assembly 100 depicted in FIG. 1 is a non-limiting example of a quantitative microscopy assembly. Other examples may include variations in quantities of individual components, such as a number of dichroic, excitation, and emission filters, a configuration of the light source, relative positioning of the components, etc. Specific examples of how the quantitative microscopy assembly may be arranged to increase throughput while providing high resolution results is described herein. In one example, the quantitative microscopy assembly, e.g., the assembly 100 of FIG. 1, may be used for high frequency screening of biological samples.

In one example, as shown in FIG. 2, a multi-detector system 200 may be formed of four individual blades 202 arranged in an x-shaped configuration. The multi-detector system 200 is depicted in FIG. 2 with an upper portion of the system and portions of a housing 220 of the multi-detector system 200 omitted for clarity. The upper portion may include a top plate 207 of the housing 220 of the multi-detector system 200 as well as a sample receiving assembly 211. A set of reference axes 201 is provided, indicating a y-axis, an x-axis, and a z-axis. In one example, the z-axis may be parallel with a direction of gravity. Furthermore, a central axis 204 of the multi-detector system 200 may be parallel with the z-axis. Each blade 202 of the multi-detector system 200 may include at least the components depicted in the assembly 100 of FIG. 1 and the blades 202 may be operated concurrently to collect image data in parallel. Each blade 202 therefore forms an individual quantitative microscopy assembly. The components arranged in each of the blades 202 may be positioned to optimize both an FOV of an objective of each blade and a magnification/resolution of the resulting images. As such, the components may be arranged in a vertical orientation, e.g., as a stack along each blade.

In the view shown in FIG. 2, a side wall 205 of the housing 220 of the multi-detector system 200 is omitted to show two of the blades 202 and two of the blades 202 are enclosed by the housing 220. The housing 220 includes a top plate 207 coupled to top edges of two pairs of opposite oriented side walls 205. The top plate 207 may be a rigid plate with a square geometry and may have similar dimensions to a base 222. The top plate 207, the base, and the side walls 205 form an approximately rectangular prism for enclosing components of the multi-detector system 200.

For example, each blade 202 of the multi-detector system 200 may be similarly configured, including a vertically oriented plate 206 supporting a variety of components. Each blade 202 may have a front side 210 and a back side 212. An objective 208, which may be an embodiment of the objective 118 of FIG. 1, may be positioned at a top of each blade 202 with other components of each blade 202 arranged below the objective 208, with respect to the z-axis.

In one example, the objective lenses of the blades 202 are clustered around the central axis 204. The objective lens 208 may be attached to the plate 206 by an objective module 228. The objective module 228 may include an objective lens mover which may be a motor that adjusts the position of the objective lens 208 along the z-axis, as well as a position sensor (not shown) to monitor the position of the objective lens along the z-axis. The objective mover may be controlled, e.g., activated/deactivated, by a controller such as controller 124 of FIG. 1.

At the upper region of the blade 202, an objective lens 208 may be attached to the plate 206 along the inner side such that the objective 208 is aligned parallel with an inner edge of the plate 206 (e.g., towards the central axis 204 shown in FIG. 2) along the x-axis. As such, the objective 208 may be located at an upper left-hand corner (when viewing the front side 210 of the blade 202) of the blade 202 and may also protrude above a top edge of the plate 206. Furthermore, the objective 208 may be adjustable to translate along the z-axis to allow focusing of an image projected by the objective 208. Translation of a position of the objective 208 along the z-axis may be enabled by a motor, e.g., as included in an objective module, 228 or may be adjusted manually.

The objective 208 may be a substantially cylindrical component formed of a plurality of lenses enclosed within a barrel, the plurality of lenses configured to provide a target magnification of an image. The objective 208 may thus have a specific magnification and numerical aperture (NA), where the NA is a value indicating a range of angles over which the objective 208 can accept or emit light. The objective 208 is a component of the quantitative microscopy assembly positioned closest to (and below) a sample and may gather light from the sample and focus the light to produce an image. As magnification provided by the objective 208 increases, a field-of-view (FOV) of the objective 208 decreases. In one example, the objective 208 may include fixed focus lenses and may be therefore used at a specific working distance, such as a distance between 0.5-2 mm.

The objective 208 may be attached to the plate 206 by the objective module 228 extending between the objective and a protrusion of the plate 206. The objective module may include a bracket fixedly coupling the objective 208 to the objective module 228, an objective mover which may be a motor that adjusts the position of the objective 208 along the z-axis, as well as a position sensor to monitor the position of the objective along the z-axis. The objective mover may be controlled, e.g., activated/deactivated, by a controller such as controller 124 of FIG. 1. The objective module 228 may be attached to the plate 206 by a plurality of fasteners which may also be used to secure other components to the plate 206.

The blade 202 may also include the light source 248, which may be an embodiment of the light source 102 of FIG. 1, enclosed by a cover that is secured to the plate 206 by the plurality of fasteners. The cover of the light source 248 may occupy a portion of the width of the blade 202, and the cover of the light source 248 may have a rectangular outer geometry. The light source 248 may be positioned in a central region of the plate 206 such that the light source 248 (and the cover) is spaced away from all edges of the plate 206.

In one example, the front side 210 of the plate 206 may include a first optical passage 232 that extends vertically (e.g., along the z-axis) directly below the objective lens 208. The first optical passage 232 may enclose microscope components, e.g., a tube lens, emission filter, selective mirrors, etc., and may be an embodiment of the filter cube 106 of FIG. 1. A camera 238, which may be an embodiment of the detector 122 of FIG. 1, may be coupled to the plate 206 directly below the first optical passage 232. A second optical passage 246 may be coupled to the plate 206 adjacent to the first optical passage 232. In one example, the first optical passage 232 and the second optical passage 246 are optically coupled. The blade 202 may also include a light source 248, which may be an embodiment of the light source 102 of FIG. 1, enclosed by a cover 249 that is secured to the front side 210 of the plate 206.

In one example, the camera 238 may be a CCD camera configured to convert an electrical signal into optical image or video using a CCD. In another example, the camera 238 may be a complementary metal oxide semiconductor (CMOS) camera which utilizes metal oxide semiconductors to convert light into electrical signals. The camera 238 may be positioned to receive emission light from an illuminated sample to allow analysis of an image generated by the camera, the emission light delivered from the sample to the camera 238 via the objective 208 and the first optical passage 232. The camera 238 is thereby optically coupled to the objective 208 by the first optical passage 232. The camera 238 may be mounted at the bottom end of the first optical passage 232 and maintained in place by a bracket or some other supporting mechanism.

In one example, the front side 210 of the plate 206 of the blade 202 may support a laser auto-focus sensor (LAF sensor) 242. In one example, the LAF sensor 242 may emit a laser beam into an optical path of the quantitative microscopy assembly, such that the LAF sensor 242 may use the laser beam as an optical probe to determine a focus of the quantitative microscopy assembly. In one example, the LAF sensor 242 may be configured to produce a 785 nm red laser beam from a light source such as a laser diode. The laser beam may be reflected from a surface of the sample or a surface of a sample holder (e.g., a microplate) and return to the LAF sensor 242 as an optical signal which may be used to assess a focus of the quantitative microscopy assembly.

A laser auto-focus controller (LAF controller) 260 may be arranged below, e.g., with respect to the z-axis, the light source and the LAF sensor 242. The LAF controller 260 may include various electronic components for signal processing, operation of the LAF sensor 242, monitoring a status of the LAF sensor 242, etc., and adapted with a connector 262 to allow coupling of a cable to the LAF sensor 242. The cable may enable communication between the LAF sensor 242 and the LAF controller 260. The LAF controller 260 may include a plurality of ports along to allow the LAF controller 260 to be connected to, for example, a system controller, such as the controller 124 of FIG. 1. The LAF controller 260 and LAF sensor 242 may be referred to as a LAF system. In one example, the LAF system may be an embodiment of the auto-focus system 130 of FIG. 1.

Connectivity between the LAF controller 260 and the system controller may allow a position of the objective lens 208 to be adjusted based on an alignment of the quantitative microscopy assembly focus with a target focal plane as detected by the LAF sensor 242. For example, the LAF controller 260 may include computer readable instructions for executing an auto-focusing routine for adjusting a position of the objective lens 208 relative to a subject positioned in a well 221 of the microplate 215. In response to the information from the LAF controller 260, the system controller may command adjustment of the objective 208 by activating the objective mover of the objective module and modifying the position of the objective 208 along the z-axis accordingly.

The LAF sensor 242 may be oriented parallel with and spaced away from the first optical passage 232, extending along a portion of the height of the plate 206. A plurality of optical elements may be included in the LAF sensor 242, including a light source for generating the laser beam and a detector for receiving the reflected laser beam which may be processed by an LAF controller 260 (described below). In one example, the detector may be configured as a CCD or a CMOS detector. The plurality of optical elements may further include a focal plane array, one or more lenses, an aperture stop, a beam splitter, etc. The laser beam may thereby be directed and shaped by the plurality of optical elements to generate the optical signal used to align the focus of the quantitative microscopy assembly.

The LAF sensor 242 may transmit the laser beam at a top end of the LAF sensor 242 in a direction perpendicular to an optical path of the first optical passage 232. For example, the second optical passage 246 may extend horizontally, e.g., along the x-axis, between the top end of the LAF sensor 242 and the first optical passage 232, and may merge with the first optical passage 232 at an intersection. The second optical passage 246 may be enclosed in a casing with flat surfaces, the casing attached to the plate 206 by the plurality of fasteners or other fastening devices and may merge continuously with the first optical passage 232 such that the first and second optical passages 232,246 are optically coupled. The laser beam emitted by the LAF sensor 242 may thereby pass through the second optical passage 246 and merge with excitation light. As the laser beam passes through the second optical passage 246, the laser beam may interact with components enclosed within the first and second optical passages 232, 246 that facilitates deflection and transmission of the laser beam and excitation light, as described further below.

The plate 206 may further include a plurality of apertures arranged between the LAF controller 260 and the bottom edge of the plate 206. The plurality of apertures may be aligned along the axis and separated into two groups, each with three apertures. Fasteners may be inserted through the plurality of apertures to attach the plate 206 to a mounting device, such as a bracket, used to couple the plate 206 to a base, e.g., the base 222 of FIG. 2, of the multi-detector system 200.

The multi-detector system 200 may further include a sample receiving assembly 211 positioned above and attached to the top plate 207. In one example, the sample receiving assembly 211 may include a plate holder 213 coupled to a stage 217. The plate holder 213 may include a portion that extends onto and over the stage 217, forming a bracket 219. The bracket 219 may be secured to the stage 217 via fasteners, thereby fixedly coupling the stage 217 to the plate holder 213. The stage 217 is arranged alongside the plate holder 213 (with the exception of the bracket 219 of the plate holder 213) such that the stage 217 is located beside a microplate 215 when the microplate 215 is positioned in an opening 223 of the plate holder 213. The stage 217, configured to adjust the position of the plate holder 213 along the top plate 207, is coupled to the plate holder 213.

In one example, the objective lenses 208 may extend upwards from the blades 202 into a space between the top plate 207 and the plate holder 213 but do not contact the plate holder 213 or the microplate 215 supported by the plate holder. The plate holder 213 may be translated along the x-y plane without obstacles impeding movement of the plate holder 213. A distance that the plate holder 213 is vertically spaced away from the objective lens 208 may be configured to allow the objective lenses 208 to be positioned at a target distance from the microplate 215, located above, and a target distance from tube lenses, located below. By placing the objective lenses 208 at the target distances from the microplate 215 and the tube lenses, a maximum FOV and resolution may be obtained from the quantitative microscopy assemblies of the multi-detector system 200.

The stage 217 may be a two-axis stage configured with bearings, such as mechanical bearings, air bearings, etc., to allow the plate holder 213 to translate along each of the x-axis and the y-axis relative to the objective lenses 208. In some examples, movement of the stage, and therefore of the plate holder 213, may be controlled by a motor. In other examples, a relative position of the stage 217 may be manually adjusted. Adjustment of the positioning of the stage 217 allows the FOVs of the objective lens 208 to be modified with respect to the microplate 215, allowing complete imaging of the microplate 215.

Each blade 202 clustering around the central axis 204 forms an area of space in which a central fan 225 may be located. The multi-detector system 200 is shown resting on a chassis 227. The chassis 227 may support peripheral components such as electronic devices coupled to the multi-detector system 200. The multi-detector system 200 may also include vibration isolators 230 coupled to the base 222 of the housing 220. The vibration isolators 230 may be supports upon which the housing 220 of the multi-detector system 200 sits.

Turning first to the first optical passage 232, an emission filter may be arranged in the first optical passage 232 proximate to the intersection of the first optical passage 232 and the second optical passage 246. The emission filter may be an example of the emission filter 114 of FIG. 1, configured to remove undesired wavelengths from emission light travelling from the objective 208 to the camera 238. Materials from which the emission filter may be formed include colored glass, glass with a dielectric optical coating for a specific wavelength, acrylic, etc., and may be configured with longpass or bandpass transmission.

The emission filter may be directly coupled to a tube lens such that light filtered by the emission filter immediately passes through the tube lens. In one example, the emission filter may be attached to the tube lens to form a single unit. For example, the emission filter may include a frame with a fitting configured to have a press-fit connection or threaded connection to mate with a similar connection at the tube lens.

The tube lens may have optical properties configured to complement optical properties of the objective 208. The tube lens is separated and spaced away from the objective 208 by a distance. In one example, the distance may be between 50-200 mm. In a second example, the distance may be between 85-90 mm. However, other distances are possible. The tube lens may be decoupled from the objective 208 to allow variable pairing of tube lens focal length with objective magnification to achieve a desired balance between resolution and FOV.

A bottom end of the tube lens may be connected to a camera mount which couples the camera 238 to the tube lens and maintains the position of the camera 238. For example, camera 238 may have a threaded engagement with the camera mount. The camera mount may be similarly coupled to the tube lens and may have a length configured to dissipate heat between the tube lens and the camera 238. As such, the camera mount may also be a thermal isolator and may assist in thermal management at the camera 238. For example, any heat generated by interaction of the emission light with the emission filter and/or tube lens may be absorbed by the camera mount. The camera mount may be formed of a plastic with insulating properties.

The light source 248 includes light-emitting diodes (LEDs) arranged around a set of dichroic mirrors. The LEDs includes a first LED, a second LED, a third LED, and a fourth LED. Each of the LEDs may be configured to emit light of different wavelengths. For example, the first LED may have a center wavelength of 630 nm, the second LED may have a center wavelength of 470 nm, the third LED may have a center wavelength of 390 nm, and the fourth LED may have a center wavelength of 555 nm. However, other center wavelengths may be possible. During sample imaging, each of the LEDs may be individually activated to illuminate the sample with different wavelengths of light, according to which of the LEDs is activated. A separate image of the sample may be obtained from each illumination channel of the LEDs which provides images depicting variations in sample fluorescence depending on the center wavelength of the incident light.

By directly coupling the light source 248 to the blade 202, rather than positioning the light source external to the blade 202 and distal to other imaging components supported on the plate 206, an illumination provided by the light source may be brighter. As a result, shorter exposure times are enabled which may lead to increased imaging speed. In other examples, the light source 248 may instead be coupled by an optical cable, fiber optics, etc., but, as such, may provide less bright illumination.

The set of dichroic mirrors may be arranged in an area between groups of the LEDs and includes a first dichroic mirror, a second dichroic mirror, and a third dichroic mirror. The location and angle of the set of dichroic mirrors relative to the LEDs may be configured to allow a target set of wavelengths to be transmitted to the sample while reflecting shorter wavelengths. Each of the set of dichroic mirrors may be long-pass (LP) dichroic mirror configured with a specific wavelength threshold above which light with sufficiently long wavelengths is able to pass therethrough. The set of dichroic mirrors may therefore be arranged such that each of the set of dichroic mirrors is positioned in a pathway of a suitable LED of the LEDs. Light generated at each of the LEDs interacts with at least one of the dichroic mirrors before passing through an output light guide.

The transmitted/reflected light (e.g., excitation light) from each of the LEDs may be reflected from the first dichroic mirror, through the output light guide along a linear path parallel with the z-axis, to a first selective mirror. A top of the output light guide may be aligned with a top of the emission filter along the x-axis, for example. The first selective mirror may be positioned in the second optical path and oriented at a similar angle with respect to the x-axis as the angle of the set of dichroic mirrors, e.g., 45 degrees.

The excitation light from the LEDs may be reflected at the first selective mirror by 90 degrees. The reflected excitation light travels parallel to the x-axis in the second optical path from the first selective mirror to a second selective mirror. The first selective mirror may be configured with a coating that causes light of wavelengths below a threshold wavelength to be reflected while light above the threshold wavelength may be transmitted without interference or obstruction through the first selective mirror. For example, the threshold wavelength of the first selective mirror may be 700 nm. All excitation light from the LEDs are therefore reflected at the first selective mirror while the laser beam (e.g., the 785 nm red laser) from the LAF sensor 242 passes through the first selective mirror.

At the second selective mirror, the excitation light and a first portion of the laser beam are reflected by 90 degrees, and merge along a common, linear path upwards along the z-axis, through the first optical passage 232 to the objective 208. A beam formed of the excitation light and the first portion of the laser beam may continue through the objective to the sample where the excitation light induces fluorescence of the sample. The second selective mirror may be arranged in the first optical passage 232 at the intersection of the first optical passage 232 with the second optical passage 246. The second selective mirror may be oriented at a similar angle relative to the x-axis as the first selective mirror, e.g., at the angle of the set of dichroic mirrors. The first portion of the laser beam reflected at the second selective mirror may represent most of the laser beam, e.g., more than 50% of the laser beam photons. The second portion of the laser beam is smaller than the first portion and may be transmitted through the second selective mirror may continue along the x-axis to be attenuated at the housing of the first optical passage 232. The LAF sensor 242 may be preferentially tuned to minimize the second portion of the laser beam.

Upon illumination by the excitation light, the sample may emit light at a different wavelength than a wavelength that induces fluorescence. The emitted light, e.g., emission light, may travel along a linear path from the sample to the camera through the first optical passage 232. As such, the second selective mirror is positioned in a path of the emission light and may be configured to allow the emission light to pass therethrough unobstructed. The second selective mirror may thus be adapted with a coating that reflects wavelengths generated by the LEDs and the LAF sensor 242 but transmits expected wavelengths of the emission light. For example, the second selective mirror may allow transmission of wavelengths between 400 and 700 nm. The transmitted light is then filtered as it passes through the emission filter, as described above.

The light source 248 may be powered and controlled by a printed circuit board assembly (PCBA). An example of a PCBA 203 is depicted coupled to the back side 212 of the blade 202. The PCBA 203 may include various electronic components coupled to a printed circuit board (PCB) 209. For example, the LEDs of the light source 248 may be directly coupled to the PCB 209 via soldering. The various electronic components may further include diodes, capacitors, resistors, switches, inductors, etc.

As shown in FIG. 3, a method 300 for obtaining a reference image offline and developing an intensity model based on the reference image. Instructions configured, stored, and executed in at least one memory by at least one processor of a computing devices (e.g., a controller) may cause the computing device to store a plurality of model parameters that define the intensity model may be stored in non-volatile memory of hardware of an imaging system. By storing the developed intensity model in non-volatile memory of the hardware, the plurality of model parameters may be accessed on-demand according to the instructions during the flat-field correction process.

At 302, the method 300 includes obtaining a reference image offline for flat-field correction. The reference image may be obtained offline when the imaging system is not actively performing high speed image data acquisition (DAQ) by imaging a uniform fluorescence sample with a pre-determined optical alignment of the microscopy imaging system, such as an operation wavelength or optical path. In particular, the reference image may be produced by imaging the uniform fluorescence sample, such as a dye solution or a slide impregnated with an emitter that is uniformly distributed. In some embodiments, the reference image may be the same size as a raw image.

At 304, the method 300 includes modeling an intensity of the reference image. The optical system, as described with respect to FIG. 1, may be rotationally symmetric about an optical axis, and therefore, the intensity of the reference image may be modeled as a surface produced by the rotation of an analytical curve about its center axis. Some examples of the analytical curves may include a Gaussian curve, a Lorentzian curve, a polynomial function, and the like. In some embodiments of the present disclosure, an intensity model of the reference image may be based on one analytical function or a linear combination of a plurality of analytical functions. Selecting an appropriate combination of the plurality of analytical functions may be based on characteristics of the intensity roll-off by the optical system.

In one embodiment, the Gaussian curve may be rotated about its center axis, producing a surface that functions as the intensity model of the reference image. The Gaussian curve may be expressed by the following equation:

$$I(x, y) = a \cdot e^{\frac{-[(x-x_0) \cdot cos(\theta)]^2}{2\sigma_x^2}} \cdot e^{\frac{-[(y-y_0) \cdot cos(\theta)]^2}{2\sigma_y^2}} \quad (2)$$

where a is the amplitude, $(x_0, y_0)$ is a coordinate of a peak location, $\sigma_x$ is standard deviation in a x-direction, $\sigma_y$ is standard deviation in a y-direction, and $\theta$ is the rotational angle. In one example, the intensity model may comprise a single Gaussian function wherein all degrees of freedom are utilized. As such the intensity model may include six parameters. As another example, the intensity model may be a linear combination of a plurality of Gaussian functions wherein each Gaussian function in the plurality of Gaussian functions may include different peak locations, standard deviations, and rotation angles. In particular, one example of the intensity model may include a first Gaussian function with a first peak location, a first rotational angle, a first standard deviation in the x-direction, and a first standard deviation in the y-direction and a second Gaussian function with a second peak location, a second rotational angle, and a second standard deviation in the x-direction, and a second standard deviation in the y-direction.

In another embodiment, the polynomial function may be rotated about its center axis, producing a surface that functions as the intensity model of the reference image. The polynomial function may be expressed by the following equation:

$$I(x, y) = a_0 + a_1 \cdot r + a_2 \cdot r^2 + \ldots a_n \cdot r^n \quad (3)$$

where r is the radial distance from a center located at $(x_0, y_0)$, $a_0$ is a first polynomial coefficient, $a_1$ is a second polynomial coefficient, $a_2$ is a third polynomial coefficient, and $a_n$ is a nth polynomial coefficient. The radial distance referenced in the equation above may be expressed by the following equation:

$$r = \sqrt{(x-x_0)^2 + (y-y_0)^2} \quad (4)$$

where (x,y) may be a position at a specific location of the reference image.

In one example, the intensity model may comprise a single sixth-order polynomial function. As such the intensity model may include nine parameters. As another example, the intensity model may be a linear combination of a plurality of polynomial functions wherein each polynomial function in the plurality of polynomial functions may include different polynomial coefficients, radial distances, and orders. Specifically, one example of the intensity model may include a first polynomial function with a first order, a first set of polynomial coefficients, and a first radial distance, and a second polynomial function with a second order, a second set of polynomial coefficients, and a second radial distance.

It may be understood that other embodiments may utilize analytical functions, combinations of analytical functions, and modeling methods other than described herein as the intensity model of the reference image without departing from the scope of the present disclosure. In particular, the intensity model may be determined via numerical techniques, such as non-uniform rational basis spline (NURB).

At 306, the method 300 includes obtaining model parameters via a fitting process of a curve fitting algorithm. The reference image may contain low spatial frequency, and thus, the reference image may be reduced to a subset of parameters based on analytical functions as described herein. The subset of parameters may be based on a single analytical function and/or a combination of a plurality of analytical functions. In particular, the combination of the plurality of analytical functions may be defined by a total number of parameters wherein the total number of parameters for the combination does not exceed a pre-determined value (e.g., 100). The parameters may be obtained by various curve fitting algorithms, including but not limited to the Levenberg-Marquardt algorithm. A best fitting intensity model with a lowest residual error may be determined via the various curve fitting algorithms.

At 308, the method 300 includes storing model parameters in non-volatile memory of hardware of the imaging system. The model parameters may be stored in firmware of the microscopy imaging system. Alternatively, the model parameters may be stored in at least one memory of a computing device in the optical system, such as non-volatile memory of circuitry within the optical system. In this way, the model parameters may be accessed on-demand to embed the model parameters into a raw image for flat-field correction. The method 300 then ends.

FIG. 4 illustrates a method 400 for image intensity correction. High content-analysis microscopy may demand high-speed image acquisition. In addition to utilizing high-speed cameras, faster moving stages, and auto-focusing technologies, extending a field-of-view (FOV) of the imaging optics may increase the speed of the image acquisition process proportionally to the square of a linear range increase. However, a large FOV may exceed the uniformity specification of illumination and imaging optics, resulting in intensity roll-off at a peripheral of an image. The imaging optics may include a finite conjugated objective or infinite conjugated objective and a tube lens.

The method 400 utilizes an intensity model of a reference image obtained via the method 300 in FIG. 3 in conjunction with a flat-field correction procedure to correct for intensity-roll off in a raw image. Instructions configured, stored, and executed in at least one memory by at least one processor of a computing device cause the microscopy imaging system to perform data acquisition and data analysis. During data acquisition, raw images may be acquired, model parameters may be retrieved from hardware, and model parameters may be embedded into metadata fields of the raw images. During data analysis, the raw images may be loaded, the model parameters may be retrieved from the metadata fields of the raw images, the reference image may be restored from the embedded model parameters, and flat-field correction may be performed.

At 402, the method 400 includes obtaining a raw image via an imaging system. The raw image may be acquired via the imaging system during data acquisition, such as the system described above with respect to FIG. 1 and FIG. 2. The raw image may be obtained during the time wherein the system is actively performing high-speed image data acquisition (DAQ). In some embodiments, the raw image may comprise a biological sample. At 404, the method 400 includes retrieving model parameters from hardware of an imaging system. In some embodiments, the model parameters may be retrieved by instructions configured, stored, and executed in at least one memory by at least one processor of a computing device to access non-volatile memory of the hardware of the imaging system.

At 406, the method 400 includes embedding model parameters into the raw image. The raw image may include a plurality of metadata fields, including metadata fields for sample information, imaging techniques, image acquisition settings, and image structure information, and the like, as some examples. As such, the quality of image reproduction, image processing, and image analysis may increase. For example, the model parameters may be embedded into the raw image by including the model parameters in the metadata field of the raw image in a specific image storage format during image acquisition. In this way, the model parameters may be accessed on-demand later during data analysis.

Each raw image of a plurality of raw images obtained with a pre-existing optical train may be embedded with the model parameters for the same reference image into the metadata field of the raw image. The embedded model parameters may be utilized during image processing of the raw image and/or plurality of raw images. In this way, the matching relation may be permanently maintained via the parameter embedding process. The matching relation refers to a connection between the hardware conditions wherein the image is obtained and the image data acquired. In particular, the hardware conditions include an objective lens, tube lens, and camera mounting condition. Further, the hardware conditions include illumination optics, such as LED aging condition, LED position, and all optics in the illumination branch. Model parameters may not be utilized to correct image data when changes are made to the aforementioned hardware conditions and the model parameters may be utilized to correct image data when no changes are made to the aforementioned hardware conditions.

At 408, the method 400 includes loading the raw image to an image processing unit of the imaging system. The image processing unit may be communicatively coupled to the hardware of the imaging system wherein the raw image is stored in at least one memory. During data analysis, instructions configured, stored, and executed in at least one memory by at least once processor of the hardware of the imaging system may cause the raw image to be uploaded to the image processing unit of the imaging system. In some embodiments, the uploaded image may be displayed on a display device, such as a computer screen, for example. At 410, the method 400 includes retrieving embedded model parameters from a metadata field of the raw image. Further instructions configured, stored, and executed in at least one memory by at least one processor of the hardware of the imaging system may cause the embedded model parameters in the metadata field of the raw image to be retrieved for data analysis. The embedding is completed when the system is not actively performing high-speed image data acquisition (DAQ) due to the time sensitivity of acquiring the images.

At 412, the method 400 includes restoring the reference image based on embedded model parameters. As described herein, the model parameters may be embedded into the metadata field of the raw image during image acquisition. After obtaining the plurality of raw images and embedding the model parameters, instructions configured, stored, and executed in at least one memory by at least one processor of a computing device may cause the computing device to access the model parameters from a designated metadata field and restore the reference image based on the model parameters for data analysis. The restoration is completed when the system is not actively performing high-speed image data acquisition (DAQ) due to the time sensitivity of acquiring the images.

In this way, the reference image may be utilized to perform a flat-field correction procedure without storing large quantities of data (e.g., tens of millions of values) in memory. In some embodiments, the reduction of the data set for the reference image may reduce the quantity of data processed or stored during the image acquisition process. In turn, this may increase the speed of the image acquisition process.

At 414, the method 400 includes performing flat-field correction to remove intensity variation and obtaining a corrected image. Flat-field correction may be computed via the following equation:

$$C = \frac{(R-D)}{(F-D)} \cdot m \qquad (1)$$

wherein R is the raw image, D is a dark frame, F is the flat-field frame (e.g., reference image), C is a corrected image in two-dimensional (2D) array format, and m is a scalar multiplier. The intensity model and the model parameters of the intensity model may act as the flat-field frame in the equation above. In some embodiments, the dark frame may be negligible or may be subtracted via an in-line process. Accordingly, the flat-field correction may be performed via 2D array division such that the intensity of pixels in the raw image may be adjusted, resulting in a more uniformly illuminated image.

The corrected image may be obtained by performing flat-field correction based on the entirety of the raw image or a specific region of the raw image. The specific region of the raw image may be corrected by identifying the specific region and matching the specific region to a correlated region on the reference image. In this way, regions of interest, such as in a biological sample, or regions with undesirable intensity roll-off may be corrected, which in turn, reduces the computational load and increases computational efficiency of the flat-field correction process. The method 400 then ends.

Figure 5D:
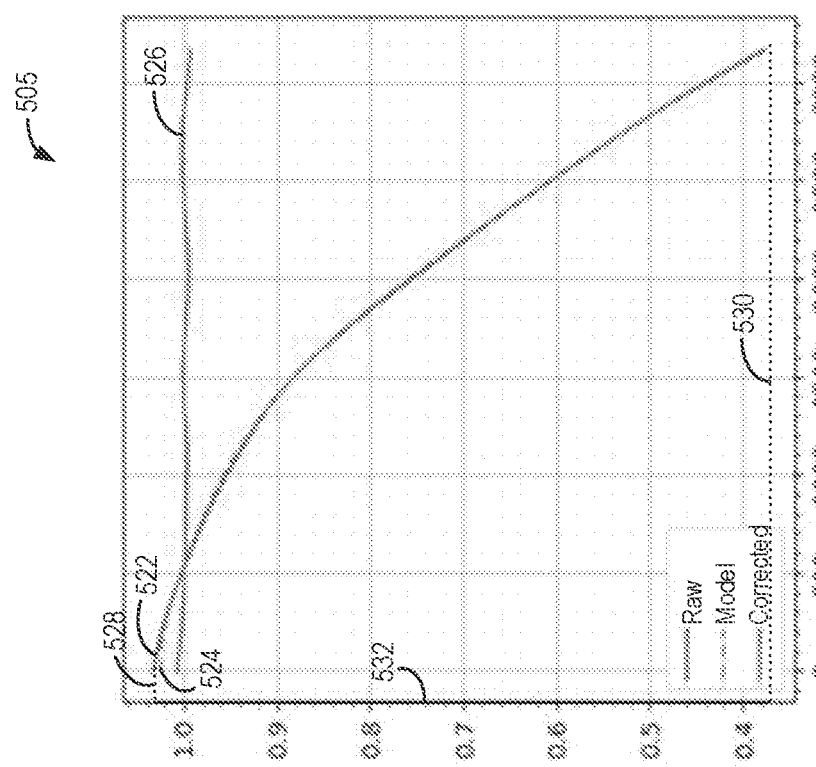
Figure 5C:
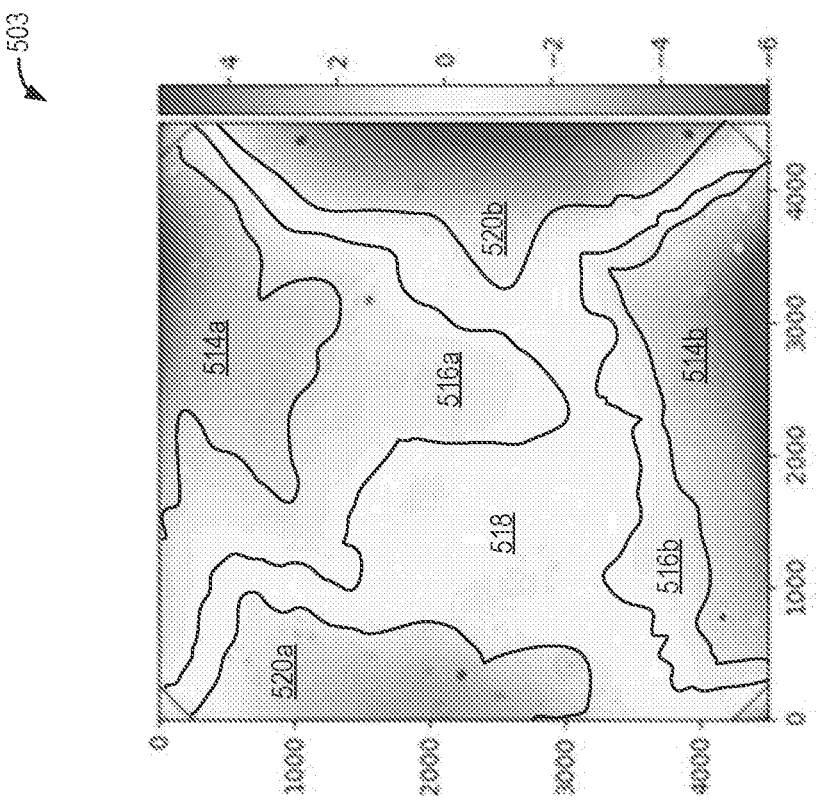

As illustrated in FIGS. 5A-5D, an example of intensity correction modeling. FIGS. 5A and 5B include a plurality of images that demonstrate various aspects of the image intensity modeling process described above with respect to FIG. 2, such as obtaining reference images and reproducing an intensity model based on model parameters. Further, FIG. 5C illustrates residual error between the reproduced intensity model and a corrected image. FIG. 5D shows a plot of a plurality of radial intensity profiles. The plurality of radial intensity profiles illustrates the difference in image intensity between a raw image, a reproduced intensity model, and a corrected image.

Turning to FIG. 5A, a reference image 500 may be obtained according to the method described herein (e.g., method 300 of FIG. 3). The reference image 500 may be acquired by imaging a uniform target via a microscopy imaging system, such as the system illustrated in FIG. 1 and FIG. 2. In particular, the reference image 500 is a fluorescence microscope slide that may match a designated fluorescence channel. The illumination optics of the reference image 500 may be aligned to the optical axis of the imaging optics within a pre-determined tolerance (e.g., 50% of the field-of-view (FOV)).

In some embodiments of the present disclosure, including the reference image 500, a sample slide may be subjected to a Kohler illumination scheme. In particular, excitation of the sample slide may be according to the Kohler illumination scheme. As such, the sample slide may not be positioned exactly at the focal plane; rather, intentionally defocusing the sample slide by approximately 5-10 μm may decrease the effects of defects or dust particles on the sample slide on the uniformity of the reference image 500. The Kohler illumination may provide a constant illumination pattern for the slight defocusing range discussed above.

FIG. 5B illustrates a reproduced intensity model 501 based on model parameters of an intensity model. The reproduced intensity model 501 is based on the rotation of a polynomial (e.g. second to ninth order) according to the method described herein. A curve fitting algorithm, such as curve fitting algorithms discussed above with respect to FIG. 3, may model the intensity variation by determining a plurality of parameters, such as five to twelve parameters, via a fitting process. Intensity variation of the sample slide may be reproduced via the plurality of parameters, producing the reproduced intensity model 501. Intensity variation of the reproduced intensity model 501 due to a dark current of the sensor may be several orders of magnitude less than other sources of intensity variation. As such, the dark frame in the flat-field correction may be ignored.

Both FIGS. 5A and 5B includes a plurality of intensity regions, including a first intensity region 502, a second intensity region 504, a third intensity region 506, a fourth intensity region 508, and a fifth intensity region 510. FIG. 5A and FIG. 5B further include an arrow 512 that indicates a direction of decreasing intensity. The first intensity region 502 region is centric to both the reference image 500 and reproduced intensity model 501. The second intensity region 504 is contiguous to the first intensity region 502 and the third intensity region 506. The third intensity region 506 is contiguous to the second intensity region 504 and the fourth intensity region 508. The fourth intensity region 508 is contiguous to the third intensity region 506 and fifth intensity region 510. When comparing the plurality of intensity regions, the intensity of the first intensity region 502 exceeds that of the second intensity region 504, the intensity of the second intensity region 504 exceeds that of the third intensity region 506, the intensity of the third intensity region 506 exceeds that of the fourth intensity region 508, and the intensity of the fourth intensity region 508 exceeds that of the fifth intensity region 510.

A visual comparison of the reference image 500 of FIG. 5A and the reproduced intensity model 501 of FIG. 5B shows that the first intensity region 502, the second intensity region 504, the third intensity region 506, and the fourth intensity region 508 of the reproduced intensity model 501 exceeds that of the reference image 500. The fifth intensity region 510 shows that the intensity of the reproduced intensity model 501 is comparable to that of the reference image 500.

FIG. 5C illustrates a residual plot 503 based on percentage deviation between the corrected image and the reproduced intensity model 501 that ranges from approximately 5% to −6% deviation. The residual plot 503 includes a first intensity variation region 514a, a second intensity variation region 514b, a third intensity variation region 516a, and a fourth intensity variation region 516b, a fifth intensity variation region 518, a sixth intensity variation region 520a, and a seventh intensity variation region 520b. In some embodiments of the present disclosure, positive percent deviations may refer to regions wherein image intensity of the corrected image is greater than the reproduced intensity model. Similarly, the negative percent deviations may refer to regions wherein image intensity of the corrected image is less than the reproduced intensity model.

The first intensity variation region 514a and the second intensity variation region 514b include percentage deviations ranging from approximately 2% to 5%. The third intensity variation region 516a and the fourth intensity variation region 516b include percentage deviation ranging from approximately 1% to 2%. Percentage deviation in the fifth intensity variation region 518 ranges from approximately 1% to −1%. The sixth intensity variation region 520a and the seventh intensity variation region 520b include percentage deviations ranging from approximately −1% to −6%.

After correction of a raw image, the image intensity may be constant in the corrected image. In some embodiments, the residual plot 503 may provide insight regarding the quality of the flat-field correction. In particular, the residual plot 503 may indicate the intensity models ability to correct non-uniform image intensity of a raw image. As such, the uniformity of image intensity of the raw image may increase by replacing the intensity model with a more sophisticated model to decrease non-uniform image intensity. For example, an intensity model based on a sixth-order polynomial may result in undesirable percentage deviations in image intensity between the reproduced intensity model 501 and the corrected image. The residual error between the reproduced intensity model 501 and the corrected image may be reduced further by utilizing an intensity model based on a seventh-order polynomial instead of a sixth-order polynomial, as one example.

FIG. 5D illustrates a radial intensity plot 505 normalized by averaged intensity across 360° of the raw image, the reproduced intensity model 501, and the corrected image. The radial intensity plot 505 includes a plurality of radial intensity profiles, such as a first radial intensity profile 522, a second radial intensity profile 524, and a third radial intensity profile 526. The plurality of radial intensity profiles illustrates an average intensity from the center of an image to the periphery of the image.

The first radial intensity profile 522 illustrates intensity percentages of the raw image from the center to the periphery of the raw image. The second radial intensity profile 524 illustrates intensity percentages of the reproduced intensity model 501 from the center to the periphery of the reproduced intensity model 501. The third radial intensity profile 526 illustrates intensity percentages of the corrected image from the center to the periphery of the raw image. The radial intensity plot 505 further includes a dotted line 528, a dotted line 530, and solid line 532. The dotted line 528 intersects the vertical axis of the radial intensity plot 505 at a maximum intensity.

The dotted line 530 intersects the vertical axis of the radial intensity plot 505 at a minimum intensity. The solid line 532 that extends from the maximum intensity to the minimum intensity on the vertical axis indicates the percentage of intensity roll-off of the raw image and the reproduced intensity model 501. Based on the solid line 532, the raw image experienced an intensity roll-off of approximately 60% before correction of the raw image. After correction, the third radial intensity profile 526 is relatively flat, indicating a low percentage of intensity roll-off (e.g., approximately 1%).

FIGS. 6A-6D illustrates an example of the image intensity correction process described above with respect to FIG. 4. In particular, the image intensity correction process is performed on a biological sample by reproducing an intensity model and utilizing the intensity model to perform a flat-field correction on a raw image to correct image intensity. The intensity model may be the same as the intensity model utilized above with respect to FIGS. 5A-5D.

Figure 6D:
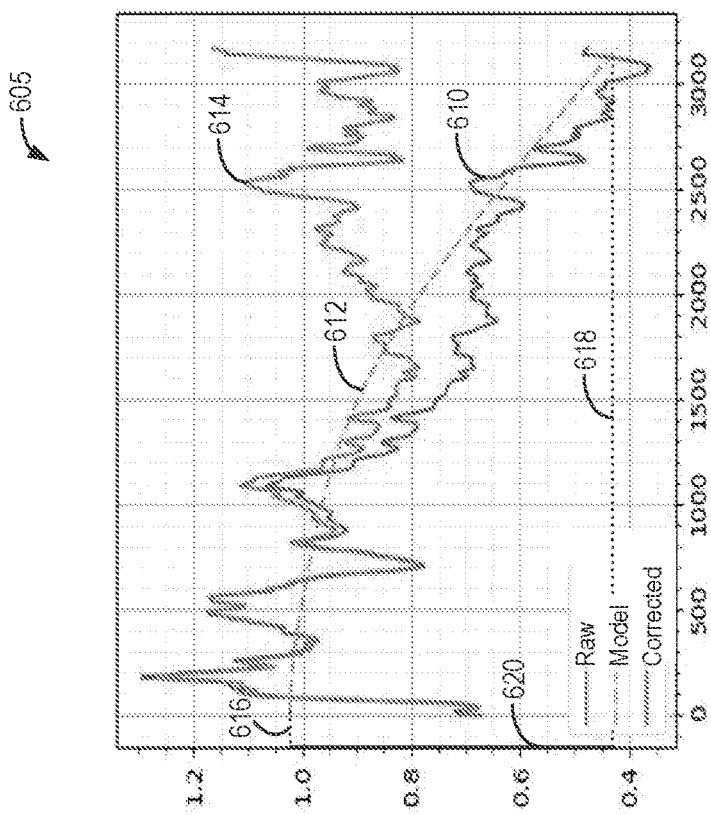
Figure 6C:
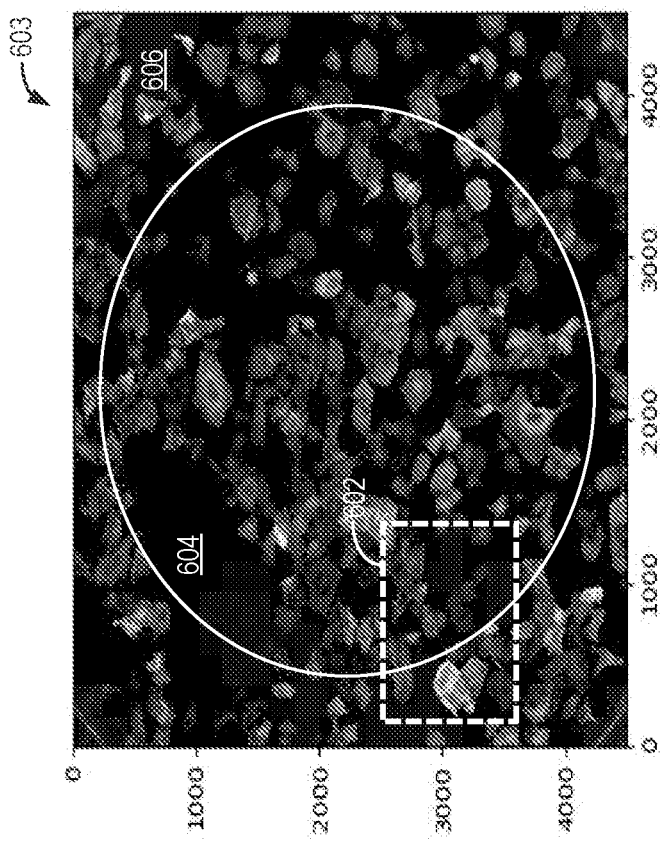

FIG. 6A shows a raw image 600 of a biological sample whereas FIG. 6C shows a corrected image 603 of the biological sample wherein flat-field correction of the entire image was performed. FIGS. 6A and 6C include a plurality of regions, such as a first region 602, a second region 604, and a third region 606. The first region 602 may be a region of interest of the biological sample. The region of interest may include scientifically relevant information regarding the biological sample. The second region 604 may be a non-peripheral, center region of the raw image 600 and the corrected image 603. The third region 606 may be a peripheral region of the raw image 600 and the corrected image 603.

Turning to FIG. 6A, a plurality of model parameters of the reference image may be stored in the metadata field of the raw image 600. The raw image 600 exhibits significant intensity roll-off that may reduce image quality. In particular, there is notable intensity roll-off in the third region or the peripheral region of the raw image 600. The quality of the raw image 600 may be increased by implementing intensity correction according to the system and methods described herein.

FIG. 6B shows a reproduced intensity model 601 based on a sixth-order polynomial. The reproduced intensity model 601 was formed via a plurality of model parameters of the intensity model that were embedded in the metadata field of raw image 600. The reproduced intensity model 601 includes the first region 602 and an arrow 608. The first region 602 in the reproduced intensity model 601 may correspond to the first region 602 in the raw image 600 and the corrected image 603. The arrow 608 indicates a direction of decreasing intensity within the reproduced intensity model 601. As such, the image intensity is highest in the center of the reproduced intensity model 601 and lowest along the periphery of the reproduced intensity model 601.

The corrected image 603 shown in FIG. 6C may be obtained by performing flat-field correction on the raw image 600 via the reproduced intensity model 601. A visual comparison of the corrected image 603 and the raw image 600 indicate that intensity roll-off is reduced in the corrected image 603. In particular, when visually comparing intensity of the first region 602, second region 604, and the third region 606 in both the raw image 600 and the corrected image 603, the intensity and overall image quality are higher in the second region 604 in the corrected image 603 than the raw image 600. The portions of the image in the first region 602, the second region 604, and the third region 606 in the corrected image 603 are clearer and more detailed than the portion of the image in the second region 604 of the raw image 600. In particular, there is significantly less darkening in the periphery and center of the corrected image 603 compared to the raw image 600.

In other embodiments of the present disclosure, a portion of the image may be subjected to flat-field correction, such as the first region 602. In this way, the first region 602 in the reproduced intensity model 601 may be utilized to correct the region of interest of the raw image 600 instead of the entire image. Opting to correct portions of the image may decrease computation costs associated with flat-field correction and may enable more rapid on-demand intensity correction. As such, higher quality images may be obtained with increased frequency.

FIG. 6D illustrates a radial intensity plot 605 normalized by averaged intensity across 360° of the raw image, the reproduced intensity model 601, and the corrected image 603. The radial intensity plot 605 includes a plurality of radial intensity profiles, such as a first radial intensity profile 610, a second radial intensity profile 612, and a third radial intensity profile 614. The plurality of radial intensity profiles illustrates an average intensity from the center of an image to the periphery of the image.

The first radial intensity profile 610 illustrates intensity percentages of the raw image 600 from the center to the periphery of the raw image 600. The second radial intensity profile 612 illustrates intensity percentages of the reproduced intensity model 601 from the center to the periphery of the reproduced intensity model 601. The third radial intensity profile 614 illustrates intensity percentages of the corrected image 603 from the center to the periphery of the raw image 600. The radial intensity plot 605 further includes a dotted line 616, a dotted line 618, and a solid line 620. The dotted line 616 intersects the vertical axis of the radial intensity plot 605 at an averaged maximum intensity. The dotted line 618 intersects the vertical axis of the radial intensity plot 605 at an averaged minimum intensity.

The solid line 620 that extends from the averaged maximum intensity to the averaged minimum intensity on the vertical axis indicates the percentage of intensity roll-off of the raw image 600 and the reproduced intensity model 601. Based on the solid line 620, the raw image 600 experienced an intensity roll-off of approximately 60% before correction of the raw image 600. After correction, the third radial intensity profile 614 irregularly oscillates about a value of 1.0 (e.g., 100% intensity), indicating the presence of the biological sample. A center line of the third radial intensity profile 614 is roughly leveled by the correction. Comparatively, the third radial intensity profile 614 is flattened compared to the raw image 600 and the reproduced intensity model 601.

Figure 7:
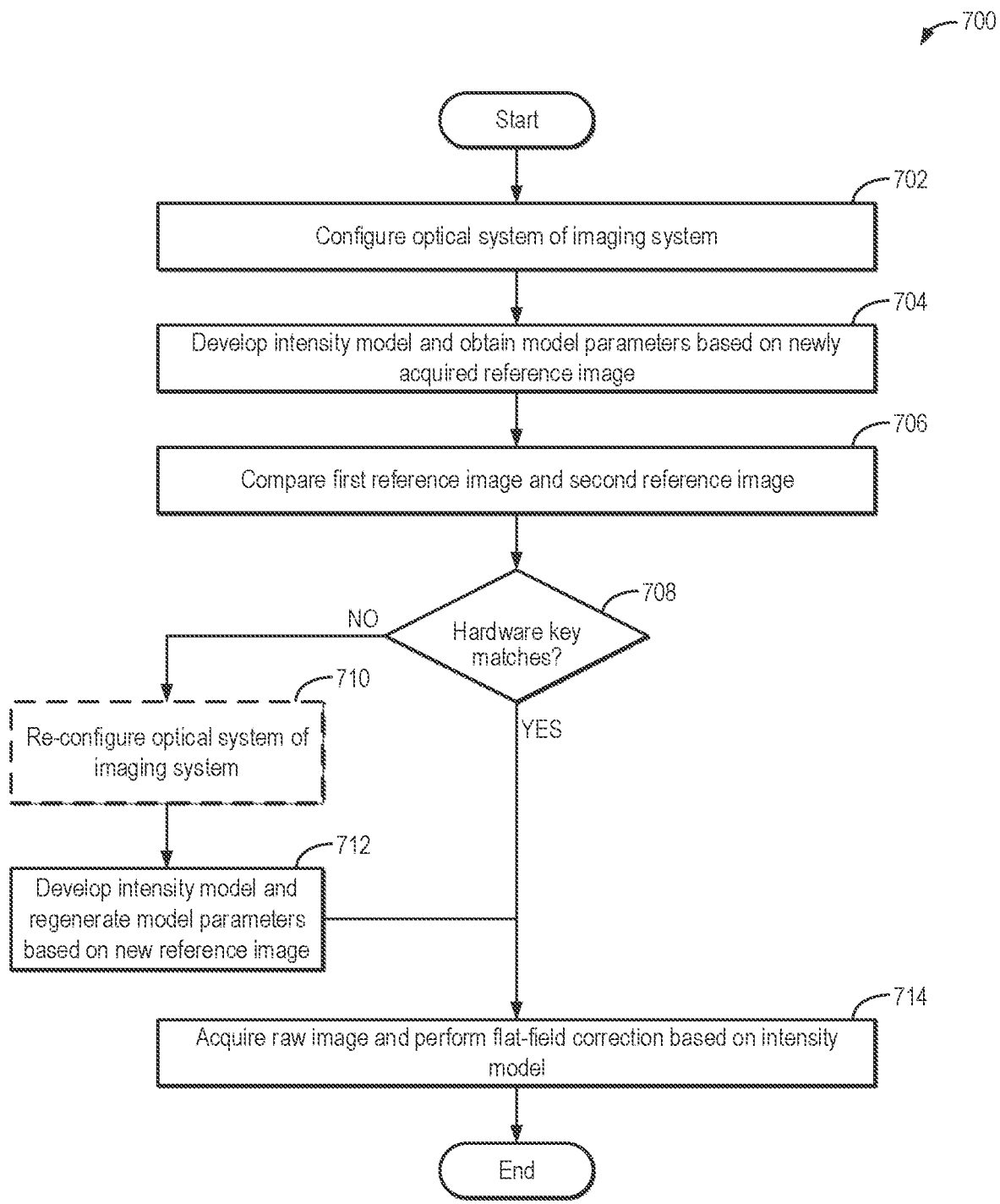
FIG. 7 shows a flow diagram of a method for a hardware signature.
Figure 8:
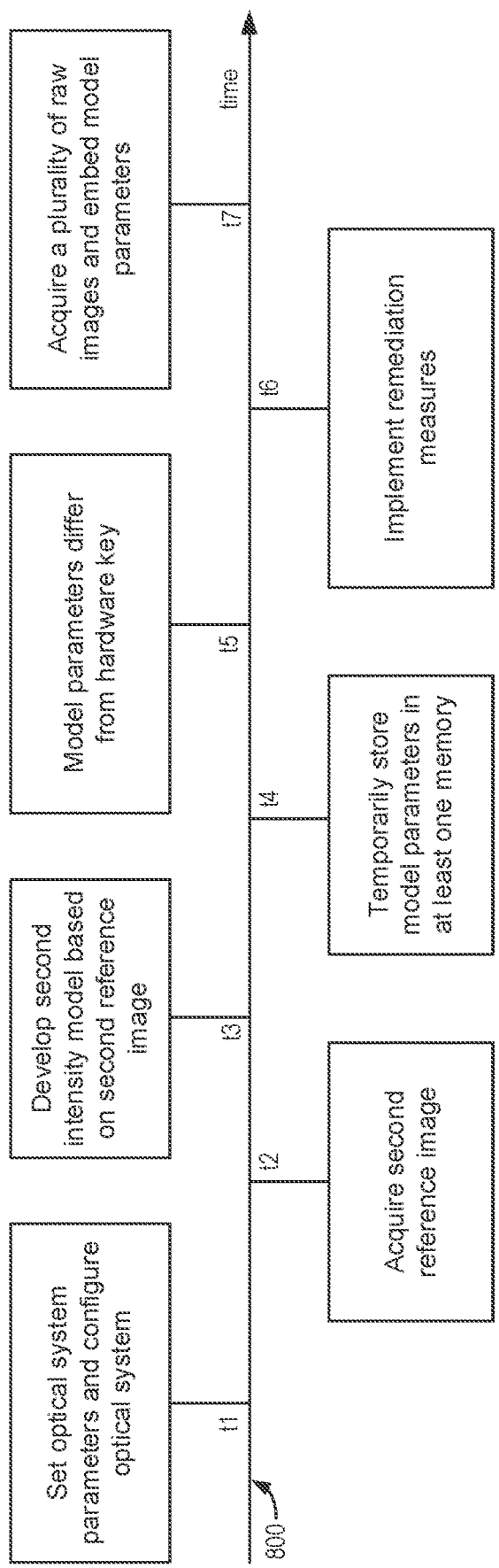
FIG. 8 shows a timing diagram of utilizing a hardware signature.

As shown in FIG. 7, a method 700 for configuring and validating an optical system of a microscopy imaging system. A reference image is dependent on the optical alignment of the microscopy imaging system and the illumination system. As such, variation in the optical system may be determined offline during, for example, new system installation or periodically scheduled maintenance by inspecting the reference image, which is utilized as a hardware signature. By comparing such a hardware signature (i.e. the reference image) to the re-created reference image using the model parameters embedded in raw images, the change or disturbance of the optical alignment (e.g. imaging or illumination optics) may be detected. In some embodiments, the hardware signature may be obtained from a previously obtained reference image during the instrument fabrication stage or through a scheduled calibration process. In this way, a user or a computing system may identify differences between the hardware signature and working model parameters.

As such, the microscopy imaging system may be configured based on various parameters of the optical system. A default reference image may be obtained via the configured microscopy imaging system to develop an intensity model based on the default reference image. Various models parameters that define the intensity model may be obtained and utilized to validate the optical system of the microscopy imaging system. Validation of the optical system of the microscopy imaging system may ensure that the desired optical alignment and optical path is maintained. Instructions configured, stored, and executed in at least one memory by at least one processor of a computing device may perform the method 700.

At 702, the method 700 includes configuring an optical system of a microscopy imaging system. As described above, the reference image depends on optical alignment of the microscopy imaging system and the illumination system. In particular, the reference image may be wavelength dependent and optical system dependent. As such, different optical system setups may utilize various operation wavelengths and optical system parameters, such as excitation or illumination schemes, to obtain raw images with increased quality. An optical system of the microscopy imaging system may be configured by setting a plurality of optical system parameters, including a light source wavelength, an alignment of light source optics, and an alignment of imaging optics and a camera. The optical system parameters may be configured according to instructions configured, stored, and executed in at least one memory by at least one processor of a computing device. In some embodiments, the computing device may be a controller communicatively coupled to the microscopy imaging system.

Depending on the application (e.g., specific biological samples), different sets of the plurality of optical system parameters may be selected for the microscopy imaging system to decrease intensity roll-off and increase image quality. By setting the plurality of optical system parameters, a plurality of reference images may be obtained via a microscopy imaging system configured according to the different sets of the plurality of optical system parameters. Accordingly, a first reference image of the plurality of reference images, which may be a default reference image, may be utilized to develop a first intensity model to obtain a first set of model parameters for the first intensity model according to the systems and methods described herein (e.g., FIG. 3).

In some embodiments of the present disclosure, the first set of model parameters may be stored in firmware of the microscopy imaging system. Alternatively, the first set of model parameters may be stored in at least one memory of a computing device in the optical system, such as non-volatile memory of circuitry within the optical system. Each set of model parameters for the plurality of reference images may be stored as well to enable the model parameters to be accessed when diagnosing the current state of the optical system. Further, each set of model parameters may be considered a hardware key for the microscopy imaging system.

At 704, the method 700 includes utilizing an acquired reference image to develop an intensity model and obtain model parameters based on a newly acquired reference image. The acquired reference image may be a second reference image obtained with the optical system configured according to the plurality of optical system parameters utilized to obtain the first reference image (or default reference image). The second reference image is obtained separately from the first reference image. A second intensity model may be developed to obtain a second set of model parameters for the second reference image according to the systems and methods described herein (e.g., FIG. 3). To ensure a direct comparison of the first reference image and second reference image, the second intensity model is developed using the same modeling equation utilized to develop the first intensity models. In some embodiments, the second set of model parameters may be stored in at least one memory of the computing device (e.g., volatile memory) and accessed by firmware of the microscopy imaging system.

At 706, the method 700 includes comparing the first reference image and the second reference image. In various embodiments of the present disclosure, the first reference image and the second reference image may be visually compared and/or compared via instructions configured, stored, and executed in at least one memory by at least one processor of a computing device of the microscopy imaging system. In one embodiment, a user may visually observe the first reference image and the second reference image to detect differences between the first reference image and the second reference image.

In another embodiment, the second set of model parameters for the second reference image may be utilized to assess the optical system of the microscopy imaging system. As described herein, the first set of model parameters may be stored in memory to act as a hardware key. The first reference image and the first set of model parameters may be a hardware signature of the microscopy imaging system and may indicate an alignment status of the optical system. The values of the second set of model parameters for the second reference image may be compared with the values of the first set of model parameters for the first reference image.

Comparison of the first set of model parameters and the second set of model parameters may include firmware of the microscopy imaging system accessing the at least one memory wherein values of the first set of model parameters and the second set of model parameters are stored. The firmware may include instructions configured, stored, and executed in at least one memory by at least one processor to evaluate the differences in value between the values of the first set of model parameters and the second set of model parameters and determine whether the differences in value are statistically significant. The model equations based on the first set of model parameters and second set of model parameters should be the same.

At 708, the method 700 includes determining whether the hardware key matches the second set of model parameters.

As described above, instructions may be configured, stored, and executed in memory of a computing device of the microscopy imaging system. In some embodiments, the instructions may calculate the difference between the values of the first set of model parameters and the second set of model parameters. The difference between the values of the first set of model parameters and the second set of model parameters may be compared with a pre-determined threshold.

If the values of the second set of model parameters do not differ from the values of the hardware key (e.g., the first set of model parameters) by a pre-determined threshold, the microscopy imaging system may not be deviating from pre-determined optical alignments and optical paths. Accordingly, the hardware key may match the second set of model parameters, and the instructions may further cause a user to be alerted in response to the default model parameters matching the model parameters. As such, the method 700 includes acquiring a raw image and performing flat-field correction based on the intensity model at 714. The raw image and flat-field correction may be performed according to the systems and method described herein, such as with the microscopy imaging system illustrated in FIG. 1 and the flat-field correction method described above with respect to FIG. 4. As the microscopy imaging system did not deviate significantly from the pre-determined optical alignments and optical paths, the default reference image (e.g., the first reference image) and the first set of model parameters for the first intensity model are utilized to obtain the raw image and perform the flat-field correction with intensity correction.

If the values of the second set of model parameters differ from the values of the hardware key (e.g., the first set of model parameters) by a pre-determined threshold, the microscopy imaging system may be deviating from pre-determined optical alignments and optical paths. Accordingly, the hardware key may not match the second set of model parameters, and the instructions may further cause a user to be alerted in response to the default model parameters not matching the model parameters. As such, the method 700 optionally includes re-configuring the optical system of the microscopy imaging system at 710. In some embodiments of the present disclosure, the first set of the plurality of optical system parameters may be reset to ensure that the microscopy imaging system is configured with the desired optical alignments and optical paths. In other embodiments, the optical system of the microscopy imaging system may not be re-configured. Rather, the plurality of optical system parameters utilized when obtaining the second reference image may be maintained. In this case, the second reference image may be established as a new default reference image.

At 712, the method 700 includes developing an intensity model and regenerating model parameters based on a new reference image. A new first reference image may be acquired via the re-configured optical system of the microscopy imaging system. A new first intensity model may be developed and a new first set of model parameters may be obtained according the systems and methods described herein. In this way, the new first reference image may act as the hardware signature of the microscopy imaging system and the new first set of model parameters may act as the hardware key. As such, the new first set of model parameters may be stored and accessed in at least one memory of the computing device of the optical system.

In some embodiments, a modeling equation of the new first intensity model may be the same as or similar to the original first intensity model of the first reference image (original default reference image). The modeling equation of the new first intensity model may include additional parameters, such as additional parameters due to modeling the new first reference image based on a seventh-order polynomial instead of a sixth-order polynomial. In other embodiments, a modeling equation of the new first intensity model may be different than the original first intensity model of the original first reference image (original default reference image). The modeling equation of the new first intensity model may include additional or different parameters due to modeling the new first reference image based on a Gaussian curve instead of a sixth-order polynomial, as one example. In another example, the modeling equation of the new first intensity model may include additional or different parameters as a result of modeling the new first reference image based on a plurality of polynomials. The plurality of polynomials may be different orders.

As described herein, in the case wherein the optical system is not re-configured and the plurality of optical system parameters are maintained, the second reference image may be established as the new default reference image or new first reference image. Accordingly, the second intensity model previously developed for the second reference image and the second set of model parameters previously obtained may be considered a new hardware signature of the microscopy imaging system. In this way, the second set of model parameters may act as a new hardware key of the optical system. However, in some embodiments, a user may decide to obtain a new first reference image different from the second reference image and not utilize the second reference image and second set of model parameters as the hardware signature and hardware key regardless if the optical system is re-configured or not.

At 714, the method includes acquiring a raw image and performing flat-field correction based on the intensity model. The raw image and flat-field correction may be performed according to the systems and method described herein, such as with the microscopy imaging system illustrated in FIGS. 1 and 2, and the flat-field correction method described above with respect to FIG. 4. Since the microscopy imaging system deviated significantly from the pre-determined optical alignments and optical paths, at least one of the second reference image or the new first reference image may act as the default reference image and hardware signature. Therefore, either the second set of model parameters or the new first set of model parameters may act as the hardware key and is utilized to obtain the raw image and perform the flat-field correction with intensity correction. The method 700 then ends.

As shown in FIG. 8, a timing sequence 800 wherein a method for configuring and validating the optical system of a microscopy imaging system is implemented, such as the method described above with respect to FIG. 7. The timing sequence 800 may be implemented for a plurality of scenarios, including during the manufacturing process to ensure quality control, after a user receives the microscopy imaging system from a manufacturer to validate that the optical system has maintained alignment tolerance throughout a shipping process, and during a debugging process of daily usage of the microscopy imaging system to assist the user.

At a time t1, a user of the microscopy imaging system (e.g., FIG. 1) sets the optical system parameters. Different applications of the microscopy imaging system may utilize different optical system setups in order to acquire high quality images. As such, each application may have a unique set of optical system parameters that configure the optical system of the microscopy imaging system. The optical system parameters may configure the optical alignment and optical path of the microscopy imaging system. A first reference image may be considered a hardware signature of the optical system of the microscopy imaging system. In particular, the first reference image may act as one default reference image of a plurality of default reference images for the various optical system setups. A first intensity model based on the first reference image may be developed for a particular set of optical system parameters, and accordingly, a corresponding first set of a plurality of model parameters of the first intensity model may act as a hardware signature of the optical system. To enable on-demand intensity correction, the hardware signature may be stored and accessed in at least one memory of a computing device of the microscopy imaging system.

At a time t2, a user may validate the optical system of the microscopy imaging system by acquiring a second reference image. As described herein, each set of optical system parameters correlates to a specific optical assembly and is valid for so long as the optical system is maintained. Deviation from the hardware signature and hardware key may indicate that the microscopy imaging system has been disturbed and the microscopy imaging system may need to be serviced in order to restore microscopy imaging system performance. Validation of the microscopy imaging system may be performed in response to adjusting or replacing optical components to assess the validity of the hardware signature and hardware key. In particular, validation may be performed as a part of the manufacturing process, shipping process, and routine usage of the microscopy imaging system.

The second reference image may be acquired by using a specific set of optical system parameters utilized to obtain the first reference image during an initial configuration and validation of the microscopy imaging system. In this way, the second reference image may be directly compared to the first reference image and existing deviations in the hardware signature may be identified. A second intensity model may be developed based on the second reference image at a time t3. The second intensity model may be developed using model equation(s) utilized to develop the first intensity model via the systems and methods described herein. A second set of model parameters may be obtained during the modeling process.

In some embodiments, a more detailed validation may include accessing the hardware key (e.g., first set of model parameters) in memory and comparing the second set of model parameters to the hardware key (e.g., first set of model parameters) stored in at least one memory. To enable a comparison of the hardware key and the second set of model parameters, the second set of model parameters may be temporarily stored in at least one memory of a computing device of the microscopy imaging system at a time t4. In this way, instructions configured, stored, and executed in at least one memory by at least one processor of the microscopy imaging system may access the location in memory wherein the hardware key is stored and the location in memory wherein the second set of model parameters are stored to compare the values.

At a time t5, the second set of model parameters differ from the hardware key, indicating that the configuration of the current optical system differs from the original configuration of the optical system. Accordingly, the user of the microscopy imaging system may receive an alert via the instructions notifying the user that image quality may be reduced and remediation measures may be implemented to restore the performance of the microscopy imaging system. Remediation measures may be implemented at a time t6. In some embodiments, the remediation measures may include resetting the plurality of operating system parameters to re-configure the optical system of the microscopy imaging system and obtaining another reference image for validation. In all embodiments of the present disclosure, the remediation measures include regenerating the model parameters for at least one of an existing optical system configuration based on an existing default reference image initially utilized for validation and the re-configured optical system based on the recently acquired reference image.

At a time t7, after regenerating a plurality of model parameters, a plurality of raw images may be acquired wherein the plurality of model parameters may be embedded in metadata fields of the plurality of raw image. For so long as the optical system setups are maintained, the plurality of default reference images may be utilized to perform flat-field correction on-demand via the plurality of model parameters embedded in the plurality of raw images. In this way, the time to complete the image acquisition and correction process may decrease and image quality may increase via on-demand intensity correction.

The disclosure also provides support for a method for flat-field correction of a raw image, comprising: acquiring a reference image and developing an intensity model based on the reference image wherein the intensity model comprises a pre-determined number of a plurality of model parameters obtained via curve fitting a single analytical function or a linear combination of a plurality of analytical functions, embedding model parameters of the intensity model of the reference image into the raw image for image processing at a later time, and correcting the raw image based on the intensity model of the reference image on-demand. In a first example of the method, the reference image is obtained via imaging a uniform sample offline via a microscopy imaging system.

In a second example of the method, optionally including the first example, the intensity model of the reference image comprises a model surface formed via a rotation of at least one analytical function or the linear combination of multiple analytical functions about a rotational axis. In a third example of the method, optionally including one or both of the first and second examples, the intensity model comprises a numerical model, such as a non-uniform rational B-spline (NURB) model. In a fourth example of the method, optionally including one or more or each of the first through third examples, an analytical function comprises a set of the plurality of model parameters obtained via curve fitting algorithms that are stored in a metadata field of the raw image. In a fifth example of the method, optionally including one or more or each of the first through fourth examples, a hardware signature comprises a hardware key comprising a set of default model parameters for a default reference image. In a sixth example of the method, optionally including one or more or each of the first through fifth examples, correcting the raw image based on the intensity model of the reference image on-demand, offline comprises utilizing the flat-field correction to perform array division via intensity values of the raw image, the intensity model, and a dark frame.

The disclosure also provides support for a method for configuring and validating an optical system, comprising: setting a plurality of optical system parameters, obtaining a first reference image with the optical system configured according to the plurality of optical system parameters, developing a first intensity model and obtaining a first set of model parameters for the first intensity model based on the first reference image, and storing the first set of model parameters in at least one memory of a computing device in the optical system. In a first example of the method, the method further comprises: obtaining a second reference image with the optical system configured according to the plurality of optical system parameters, developing a second intensity model and obtaining a second set of model parameters for the second intensity model based on the second reference image, comparing the first set of model parameters of the first reference image and the second set of model parameters of the second reference image, implementing remediation measures on the optical system responsive to the second set of model parameters not matching the first set of model parameters, and not implementing remediation measures on the optical system responsive to the second set of model parameters matching the first set of model parameters.

In a second example of the method, optionally including the first example, implementing remediation measures on the optical system responsive to the first set of model parameters not matching the second set of model parameters comprises: optionally configuring the optical system of a microscopy imaging system via resetting the plurality of optical system parameters, obtaining a new first reference image with the optical system configured according to the plurality of optical system parameters, developing a new first intensity model and regenerating the first set of model parameters for the first intensity model based on the new first reference image, and storing the first set of model parameters in at least one memory of the computing device in the optical system. In a third example of the method, optionally including one or both of the first and second examples, the first reference image is a default reference image and the first set of model parameters is a hardware key.

In a fourth example of the method, optionally including one or more or each of the first through third examples, the second reference image is obtained separately from the first reference image. In a fifth example of the method, optionally including one or more or each of the first through fourth examples, the at least one memory of the computing device in the optical system stores a plurality of default reference images and corresponding sets of model parameters. In a sixth example of the method, optionally including one or more or each of the first through fifth examples, each default reference image in the plurality of default reference images is obtained via a different set of the plurality of optical system parameters. In a seventh example of the method, optionally including one or more or each of the first through sixth examples, the plurality of optical system parameters includes pre-determined operation wavelengths.

The disclosure also provides support for a multi-detector microscope system, comprising: a set of microscope assemblies arranged in an x-configuration, each of the set of microscope assemblies including: an objective and a stage configured to support a subject to be imaged, a computing device wherein instructions configured, stored, and executed in memory by at least one processor of the computing device that when executed, cause the computing device to: configure an optical system by setting a plurality of optical system parameters, acquire a plurality of default reference images, develop a default intensity model for each default reference image and obtain default model parameters based on the default intensity model, store the default model parameters in at least one memory of the computing device, embed the default model parameters for a corresponding default reference image into a metadata field of a raw image, and perform a flat-field correction on the raw image of a plurality of raw images via the default model parameters.

In a first example of the system, the instructions further cause the computing device to: acquire a reference image of a plurality of reference images at the plurality of optical system parameters utilized to acquire the plurality of default reference images, develop an intensity model for each reference image and obtain model parameters based on the intensity model, compare the default model parameters to the model parameters, alert a user in response to the default model parameters matching the model parameters, and alert the user in response to the default model parameters not matching the model parameters. In a second example of the system, optionally including the first example, the subject is positioned on the stage, the stage being positioned above the set of microscope assemblies. In a third example of the system, optionally including one or both of the first and second examples, the plurality of default reference images and the plurality of raw images are acquired by a camera coupled to imaging optics, including a finite conjugated objective or infinite conjugated objective and a tube lens. In a fourth example of the system, optionally including one or more or each of the first through third examples, the plurality of optical system parameters includes a light source wavelength, an alignment of light source optics, and an alignment of imaging optics, and a camera.

Note that the example control and estimation routines included herein can be used with various system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to other microscope types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for flat-field correction of a raw image, comprising:
    acquiring a reference image and developing an intensity model based on the reference image wherein the intensity model comprises a pre-determined number of a plurality of model parameters obtained via curve fitting a single analytical function or a linear combination of a plurality of analytical functions;
    wherein the plurality of model parameters are retrieved from hardware of an imaging system and are utilized as a hardware signature for the imaging system, wherein the hardware signature comprises a hardware key comprising a set of default model parameters for a default reference image, and wherein the plurality of model parameters define the intensity model;
    embedding model parameters of the intensity model of the reference image into the raw image for image processing at a later time; and
    correcting the raw image based on the intensity model of the reference image on-demand.

2. The method of claim 1, wherein the reference image is obtained via imaging a uniform sample offline via a microscopy imaging system.

3. The method of claim 1, wherein the intensity model of the reference image comprises a model surface formed via a rotation of at least one analytical function or the linear combination of multiple analytical functions about a rotational axis, wherein deviations from the hardware signature indicate changes to the optical system that prevent the hardware signature from being utilized for quality control.

4. The method of claim 3, wherein the intensity model comprises a numerical model, such as a non-uniform rational B-spline (NURB) model.

5. The method of claim 3, wherein an analytical function comprises a set of the plurality of model parameters obtained via curve fitting algorithms that are stored in a metadata field of the raw image.

6. The method of claim 2, wherein deviation from the hardware signature and hardware key indicate that the microscopy imaging system has been disturbed and the microscopy imaging system needs to be serviced in order to restore microscopy imaging system performance.

7. The method of claim 1, wherein correcting the raw image based on the intensity model of the reference image on-demand, offline comprises utilizing the flat-field correction to perform array division via intensity values of the raw image, the intensity model, and a dark frame.

8. A method for configuring and validating an optical system, comprising:
    setting a plurality of optical system parameters;
    obtaining a first reference image with the optical system configured according to the plurality of optical system parameters;
    developing a first intensity model and obtaining a first set of model parameters for the first intensity model based on the first reference image, wherein the first model parameters are retrieved from hardware of the optical system and are utilized as a hardware signature for the optical system; and
    storing the first set of model parameters in at least one memory of a computing device in the optical system.

9. The method of claim 8, further comprising:
    obtaining a second reference image with the optical system configured according to the plurality of optical system parameters;
    developing a second intensity model and obtaining a second set of model parameters for the second intensity model based on the second reference image;
    comparing the first set of model parameters of the first reference image and the second set of model parameters of the second reference image;
    implementing remediation measures on the optical system responsive to the second set of model parameters not matching the first set of model parameters; and
    not implementing remediation measures on the optical system responsive to the second set of model parameters matching the first set of model parameters.

10. The method of claim 9, wherein implementing remediation measures on the optical system responsive to the first set of model parameters not matching the second set of model parameters comprises:
    optionally configuring the optical system of a microscopy imaging system via resetting the plurality of optical system parameters;
    obtaining a new first reference image with the optical system configured according to the plurality of optical system parameters;
    developing a new first intensity model and regenerating the first set of model parameters for the first intensity model based on the new first reference image; and
    storing the first set of model parameters in at least one memory of the computing device in the optical system.

11. The method of claim 8, wherein the first reference image is a default reference image and the first set of model parameters is a hardware key.

12. The method of claim 9, wherein the second reference image is obtained separately from the first reference image.

13. The method of claim 8, wherein the at least one memory of the computing device in the optical system stores a plurality of default reference images and corresponding sets of model parameters.

14. The method of claim 13, wherein each default reference image in the plurality of default reference images is obtained via a different set of the plurality of optical system parameters.

15. The method of claim 14, wherein the plurality of optical system parameters includes pre-determined operation wavelengths.

16. A multi-detector microscope system, comprising:
    a set of microscope assemblies arranged in an x-configuration, each of the set of microscope assemblies including:
        an objective and a stage configured to support a subject to be imaged;
        a computing device wherein instructions configured, stored, and executed in memory by at least one processor of the computing device that when executed, cause the computing device to:

configure an optical system by setting a plurality of optical system parameters;

acquire a plurality of default reference images;

develop a default intensity model for each default reference image and obtain default model parameters based on the default intensity model, wherein the default model parameters are retrieved from hardware of the multi-detector microscope system and are utilized as hardware signatures for the multi-detector microscope system, and wherein the hardware signatures comprise hardware keys;

store the default model parameters in at least one memory of the computing device;

embed the default model parameters for a corresponding default reference image into a metadata field of a raw image; and perform a flat-field correction on the raw image of a plurality of raw images via the default model parameters.

17. The multi-detector microscope system of claim 16, wherein the instructions further cause the computing device to:

acquire a reference image of a plurality of reference images at the plurality of optical system parameters utilized to acquire the plurality of default reference images;

develop an intensity model for each reference image and obtain model parameters based on the intensity model;

compare the default model parameters to the model parameters;

alert a user in response to the default model parameters matching the model parameters; and alert the user in response to the default model parameters not matching the model parameters.

18. The multi-detector microscope system of claim 16, wherein the subject is positioned on the stage, the stage being positioned above the set of microscope assemblies.

19. The multi-detector microscope system of claim 16, wherein the plurality of default reference images and the plurality of raw images are acquired by a camera coupled to imaging optics, including a finite conjugated objective or infinite conjugated objective and a tube lens.

20. The multi-detector microscope system of claim 16, wherein the plurality of optical system parameters includes a light source wavelength, an alignment of light source optics, and an alignment of imaging optics and a camera.

* * * * *